(12) United States Patent
Takeda et al.

(10) Patent No.: US 9,501,091 B2
(45) Date of Patent: Nov. 22, 2016

(54) TOUCH PANEL SYSTEM AND ELECTRONIC DEVICE

(71) Applicant: SHARP KABUSHIKI KAISHA, Osaka-shi, Osaka (JP)

(72) Inventors: Michiaki Takeda, Osaka (JP); Mamoru Takaya, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/890,758

(22) PCT Filed: May 16, 2014

(86) PCT No.: PCT/JP2014/063070
§ 371 (c)(1),
(2) Date: Nov. 12, 2015

(87) PCT Pub. No.: WO2014/185523
PCT Pub. Date: Nov. 20, 2014

(65) Prior Publication Data
US 2016/0091919 A1    Mar. 31, 2016

(30) Foreign Application Priority Data

May 17, 2013 (JP) .................................. 2013-105503

(51) Int. Cl.
| | |
|---|---|
| G06F 3/033 | (2013.01) |
| G06F 1/12 | (2006.01) |
| G06F 3/03 | (2006.01) |
| G06F 3/044 | (2006.01) |
| G06F 1/24 | (2006.01) |
| G06F 3/0354 | (2013.01) |
| G06F 3/038 | (2013.01) |
| G06F 3/041 | (2006.01) |

(52) U.S. Cl.
CPC . *G06F 1/12* (2013.01); *G06F 1/24* (2013.01); *G06F 3/03* (2013.01); *G06F 3/038* (2013.01); *G06F 3/03545* (2013.01); *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2012/0013555 A1 | 1/2012 | Maeda et al. | |
| 2014/0132541 A1 | 5/2014 | Miyamoto et al. | |
| 2014/0139483 A1 | 5/2014 | Miyamoto et al. | |
| 2014/0149059 A1 | 5/2014 | Miyamoto et al. | |

FOREIGN PATENT DOCUMENTS

| | | |
|---|---|---|
| JP | 2003-296021 A | 10/2003 |
| JP | 2007-531938 A | 11/2007 |
| JP | 2012-22543 A | 2/2012 |
| JP | 2013-8318 A | 1/2013 |
| WO | WO 2005/096772 A2 | 10/2005 |

*Primary Examiner* — Adam R Giesy
(74) *Attorney, Agent, or Firm* — Birch, Stewart, Kolasch & Birch, LLP

(57) ABSTRACT

In a touch panel system of the present invention, a touch pen is configured of an electronic pen that signals can be input into and output from. A touch panel controller includes a synchronization signal transmission unit that transmits a synchronization signal to the electronic pen during synchronization signal transmission periods immediately before each of a first signal line drive period and a second signal line drive period. The synchronization signal transmission unit transmits the synchronization signal of which the waveform is configured of a Manchester-coded pseudorandom sequence having periodicity to the electronic pen during the synchronization signal transmission period. The electronic pen includes a synchronization signal detecting unit that detects the synchronization signal.

7 Claims, 20 Drawing Sheets

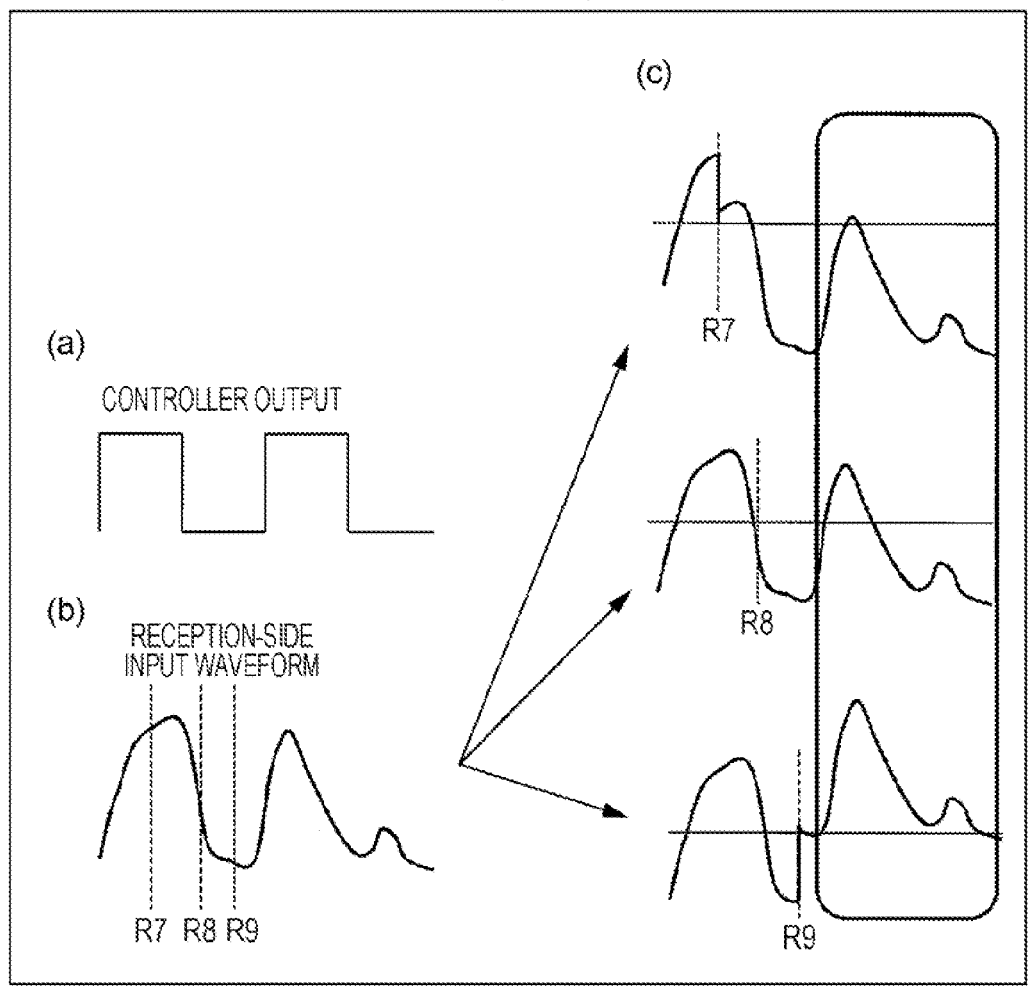
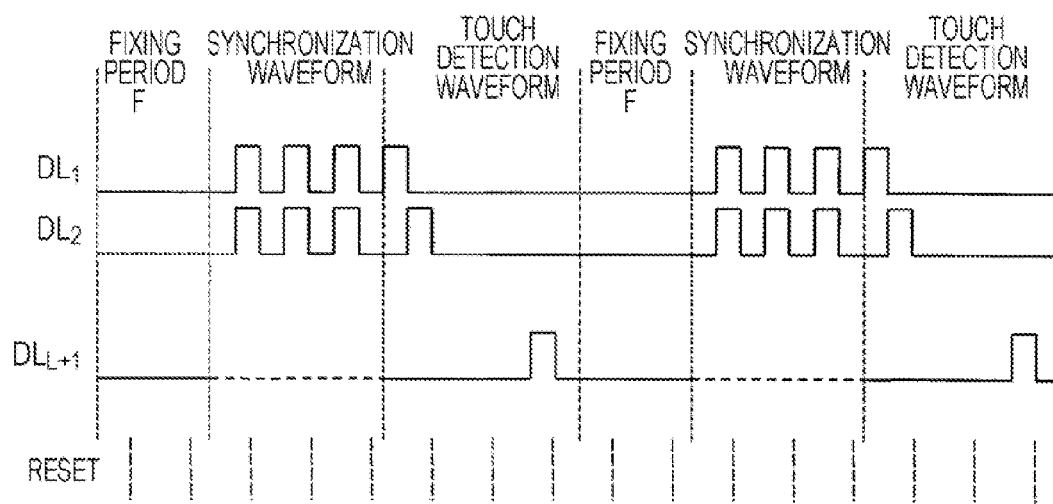

TOUCH PANEL SYSTEM AND ELECTRONIC DEVICE

TECHNICAL FIELD

The present invention relates to a touch panel system and an electronic device that detect the position of the touch of a touch pen on a touch panel which has electrostatic capacitances formed at each intersection of a plurality of first signal lines and a plurality of second signal lines. Specifically, the present invention relates to the synchronization of a touch pen and a touch panel controller.

BACKGROUND ART

In the related art, there is known, for example, a touch panel system disclosed in PTL 1 as a touch panel system that detects the position of the touch of a touch pen on a touch panel which has electrostatic capacitances formed at each intersection of a plurality of first signal lines and a plurality of second signal lines.

The touch panel system disclosed in PTL 1 includes a plurality of electronic pens, a panel main body that includes a touch face on which a touch operation is performed by the electronic pens and a finger and in which a plurality of transmission electrodes that runs parallel to each other and a plurality of reception electrodes that runs parallel to each other are arranged into a lattice, a transmission unit that applies a drive signal to the transmission electrodes, a reception unit that receives a response signal which is output from the reception electrodes in response to the drive signal applied to the transmission electrodes and outputs detection data for each intersection of the electrodes, and a control unit that detects the position of a touch on the basis of the detection data which is output from the reception unit, in which the transmission unit applies a pen synchronization signal that synchronizes the transmission and reception of a pen identifiable signal between the electronic pens and the reception unit to the transmission electrodes, the electronic pens transmit the pen identifiable signal to the reception electrodes in response to the detection of the pen synchronization signal of the transmission electrodes at the time of a touch operation, and the control unit, on the basis of the pen synchronization signal that the reception unit receives through the reception electrodes, identifies a pointed object on which a touch operation is performed.

According to this configuration, a plurality of electronic pens can be used because each electronic pen transmits the pen identifiable signal to the reception electrodes in response to the detection of the pen synchronization signal from the transmission electrodes at the time of a touch operation and because the control unit, on the basis of the pen synchronization signal that the reception unit receives through the reception electrodes, identifies the electronic pen that performs the touch operation.

The touch panel system disclosed in PTL 1 has a problem in that it is not possible to remove an erroneous signal that is generated by electromagnetic noise which is caused by the touch of a hand, a finger, and the like of a human body, which receives electromagnetic noise when touching the electronic pen, on a touch panel and which is generated at a position different from the position of the touch.

Therefore, in order to resolve this problem, the applicant of the present application suggests a touch panel system disclosed in PTL 2.

The touch panel system disclosed in PTL 2 includes a touch panel that has electrostatic capacitances formed at each intersection of a plurality of first signal lines and a plurality of second signal lines, a touch pen, and a touch panel controller, in which the touch panel controller, when repeatedly performing switched driving such that the plurality of first signal lines is driven to output charge signals based on each electrostatic capacitance from each of the second signal lines during a first signal line drive period and such that the plurality of second signal lines is driven to output charge signals based on each electrostatic capacitance from each of the first signal lines during a second signal line drive period, detects the position of a touch on the basis of a change in electrostatic capacitance due to the touch pen when the touch pen touches the touch panel.

In the touch position detecting method in the touch panel system having the above configuration, when the touch pen touches the touch panel, a detected position in the first signal line drive period and a detected position in the second signal line drive period are represented at the same position. Meanwhile, an erroneous signal due to noise that is caused by the touch of a hand, a finger, and the like of a human body, which receives electromagnetic noise, on the touch panel and that is generated at a position different from the position of the touch, even when represented in the first signal line drive period by switching driving of the first signal lines and the second signal lines, is not represented at the same position in the second signal line drive period.

Therefore, it is possible to distinguish a signal of a touch of the touch pen and an erroneous signal due to noise and easily remove the erroneous signal due to noise.

CITATION LIST

Patent Literature

PTL 1: Japanese Unexamined Patent Application Publication No. 2012-022543 (published on Feb. 2, 2012)

PTL 2: Japanese Unexamined Patent Application Publication No. 2013-008318 (published on Jan. 10, 2013)

SUMMARY OF INVENTION

Technical Problem

When an electronic pen that is provided with additional functions such as a pen pressure sensing function is used as the touch pen, it is necessary to transmit information that the electronic pen obtains to the touch panel controller. In this case, as disclosed in the touch panel system of PTL 1, the electronic pen, after detecting the pen synchronization signal emitted from the touch panel controller, transmits, for example, the pen identifiable signal to the touch panel controller side using the pen synchronization signal as reference.

However, when the pen synchronization signal emitted from the touch panel controller is wirelessly received and detected in the electronic pen, low-frequency noise is superimposed on the communication signal. Thus, it is difficult to detect the pen synchronization signal, and a problem arises in that the pen synchronization signal may not be captured.

The present invention is devised with consideration of the problem in the related art, and an object thereof is to provide a touch panel system and an electronic device capable of appropriately detecting a synchronization signal.

Solution to Problem

In order to resolve the problem, according to an aspect of the present invention, there is provided a touch panel system including a touch panel that has electrostatic capacitances formed at each intersection of a plurality of first signal lines and a plurality of second signal lines, a touch pen, and a touch panel controller, in which the touch panel controller, when repeatedly performing switched driving such that the plurality of first signal lines is driven to output charge signals based on each electrostatic capacitance from each of the second signal lines during a first signal line drive period and such that the plurality of second signal lines is driven to output charge signals based on each electrostatic capacitance from each of the first signal lines during a second signal line drive period, detects the position of a touch on the basis of a change in electrostatic capacitance due to the touch pen when the touch pen touches the touch panel, the touch pen is configured of an electronic pen that signals can be input into and output from, the touch panel controller includes a synchronization signal transmission unit that transmits a synchronization signal to the electronic pen during synchronization signal transmission periods immediately before each of the first signal line drive period and the second signal line drive period, the synchronization signal transmission unit transmits the synchronization signal of which the waveform is configured of a Manchester-coded pseudorandom sequence having periodicity to the electronic pen during the synchronization signal transmission period, and the electronic pen includes a synchronization signal detecting unit that detects the synchronization signal. The pseudorandom sequence having periodicity refers to a code sequence such as an M-sequence or a Gold sequence that is used in a pseudorandom signal which is an artificially created random signal. In addition, the driving may be either parallel driving or sequential driving.

In order to resolve the problem, according to another aspect of the present invention, there is provided an electronic device including the above touch panel system.

Advantageous Effects of Invention

According to the aspects of the present invention, the effect of providing a touch panel system and an electronic device capable of appropriately detecting a synchronization signal is accomplished.

BRIEF DESCRIPTION OF DRAWINGS

FIG. 16(a) is a waveform diagram illustrating an example of a synchronization waveform transmitted from the touch panel controller, FIG. 16(b) is a waveform diagram illustrating reset timings R7, R8, and R9 of an input waveform received by the stylus pen, and FIG. 16(c) is a waveform diagram illustrating a synchronization waveform when a reference potential is set at the reset timings R7, R8, and R9 illustrated in FIG. 16(b).

FIG. 17 is a timing chart illustrating output waveforms of the touch panel controller in which a fixing period is provided immediately before a synchronization waveform is output.

DESCRIPTION OF EMBODIMENTS

First Embodiment

An embodiment of the present invention will be described as follows on the basis of FIG. 1 to FIG. 14.
(Configuration of Touch Panel System)

Figure 1:
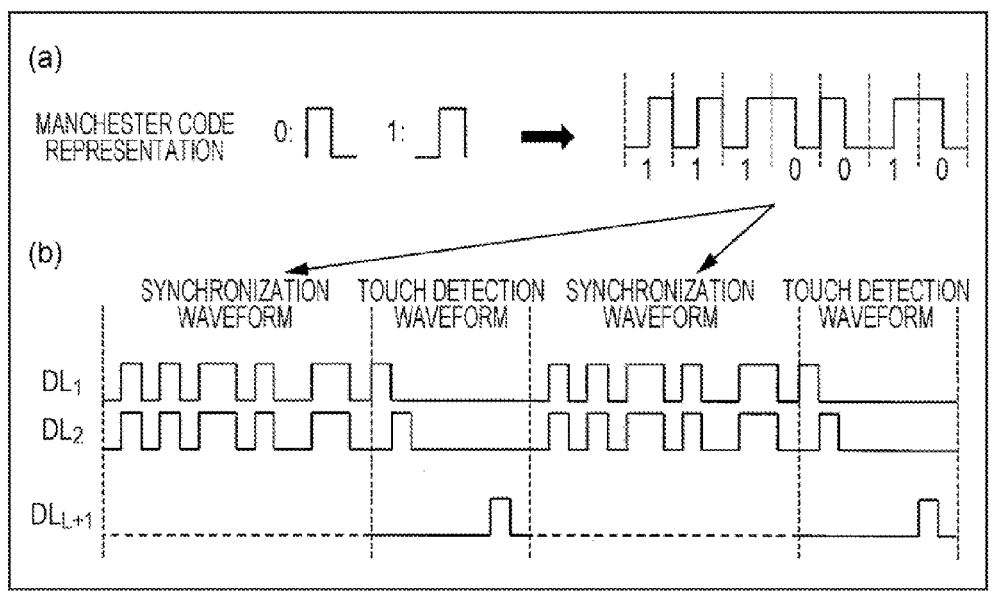
FIG. 1(a) is a diagram illustrating a synchronization waveform of a pseudorandom sequence that has periodicity, is Manchester-coded, and is transmitted to a stylus pen from a touch panel controller of a touch panel system in a first embodiment of the present invention.
FIG. 1(b) is a waveform diagram illustrating the synchronization waveform and a touch detection waveform.
Figure 2:
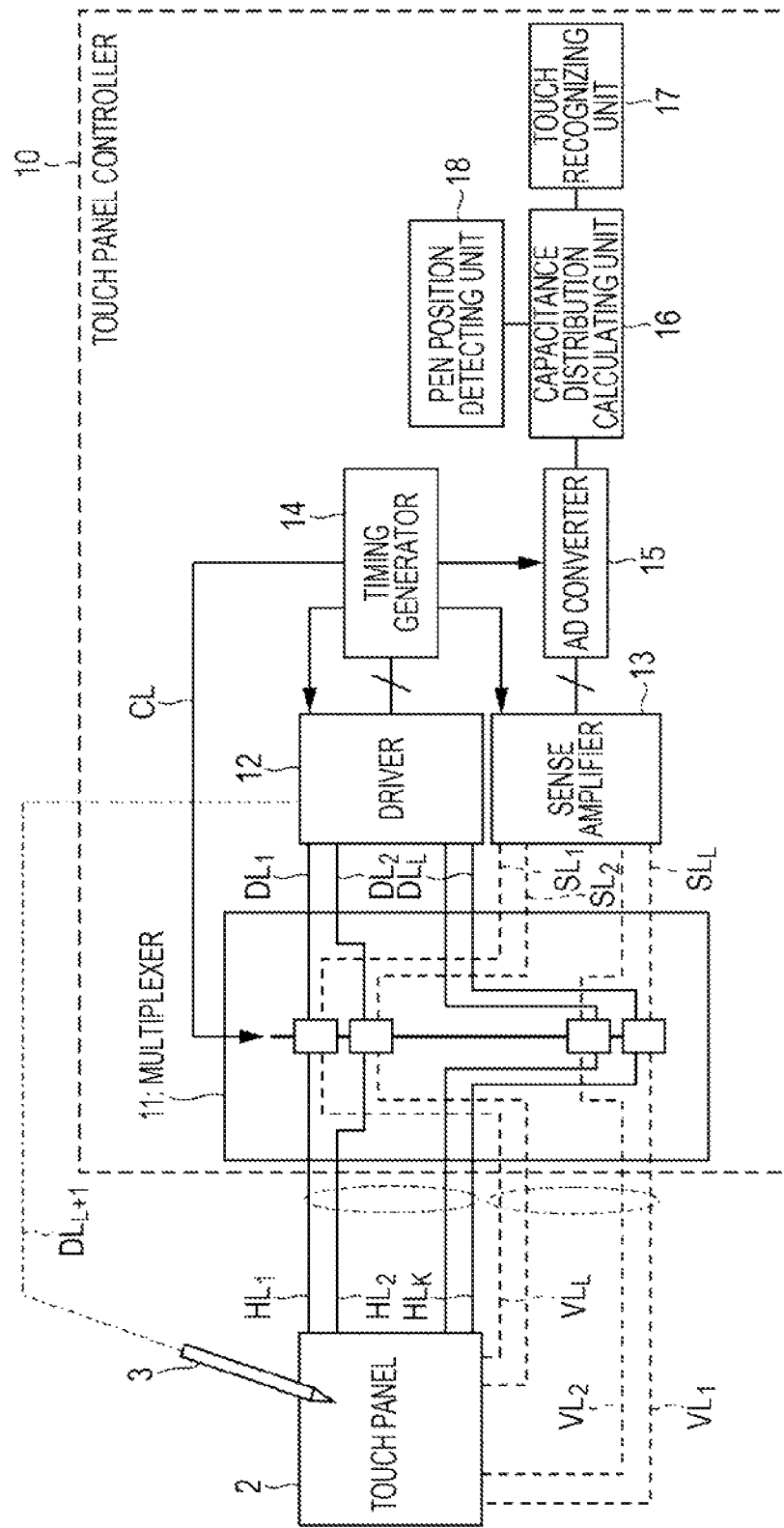
FIG. 2 is a block diagram illustrating a configuration of the touch panel system.

A configuration of a touch panel system 1 of the present embodiment will be described on the basis of FIG. 2 and FIG. 3. FIG. 2 is a block diagram illustrating a configuration of the touch panel system 1 of the present embodiment, and FIG. 3 is an interconnect diagram illustrating a configuration of a touch panel disposed in the touch panel system.

The touch panel system 1 of the present embodiment, as illustrated in FIG. 2, is provided with a touch panel 2, a stylus pen 3 as a touch pen and an electronic pen, and a touch panel controller 10 that drives the touch panel 2 and the stylus pen 3.

Figure 3:
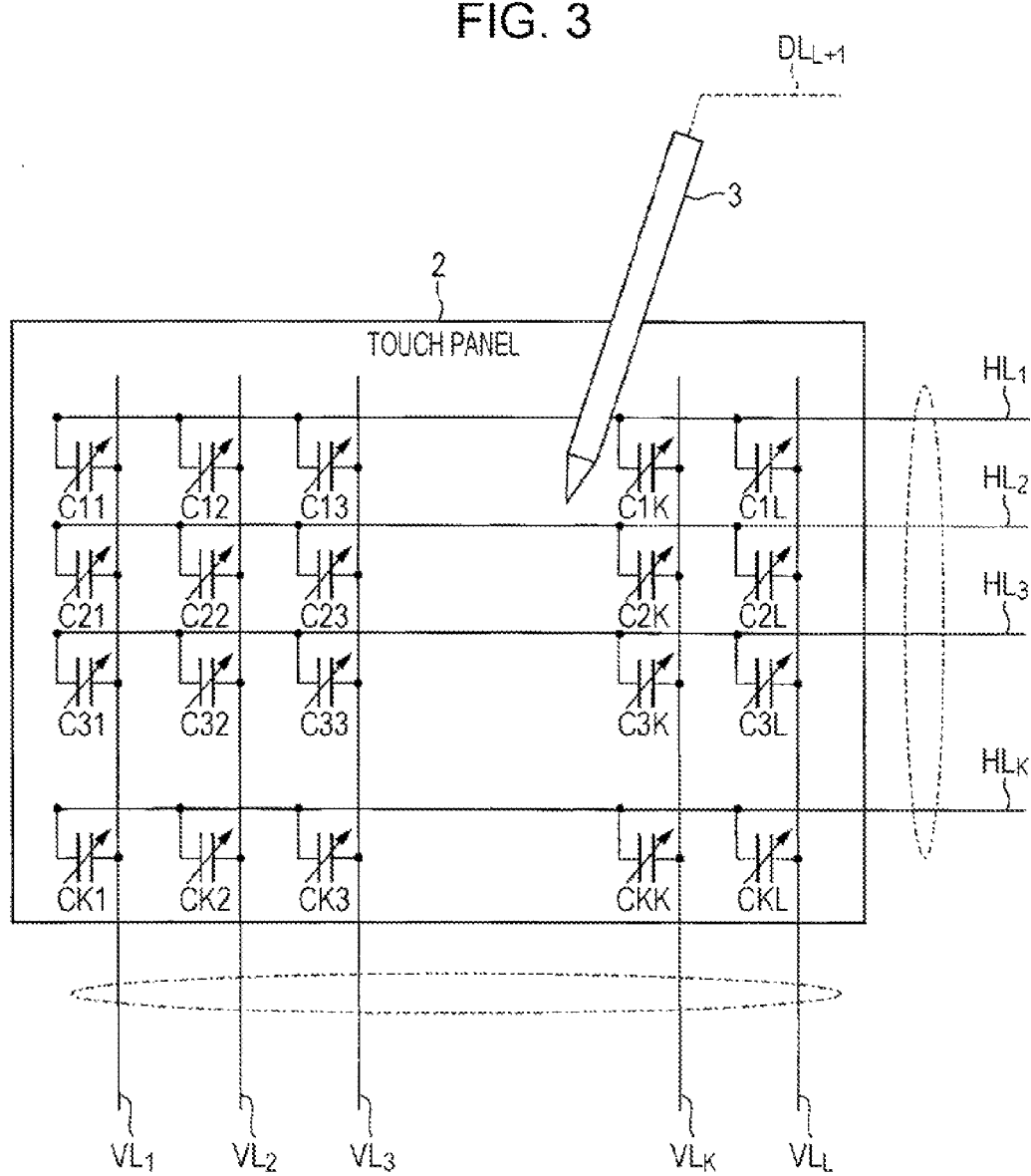
FIG. 3 is an interconnect diagram illustrating a configuration of a touch panel provided in the touch panel system.

The touch panel 2, as illustrated in FIG. 3, is provided with horizontal signal lines $HL_1$ to $HL_K$ as K (K is a positive integer) numbers of first signal lines that are plural lines arranged parallel to each other along the horizontal direction and vertical signal lines $VL_1$ to $VL_L$ as L (L is a positive integer) numbers of second signal lines that are plural lines arranged parallel to each other along the vertical direction. Electrostatic capacitances C11 to CKL are generated at each intersection of the horizontal signal lines $HL_1$ to $HL_K$ and the vertical signal lines $VL_1$ to $VL_L$. While K and L may be either the same or different, the present embodiment will be described on the assumption that L≥K. In addition, while the vertical signal lines $VL_1$ to $VL_L$ vertically intersect the horizontal signal lines $HL_1$ to $HL_K$ in the present embodiment, the present invention is not necessarily limited to this, provided that both intersect each other.

The touch panel 2, although preferably having a width such that a hand holding the stylus pen 3 can be put on the touch panel 2, may have a size used in a smartphone.

The stylus pen 3, in the present embodiment, is not only a touch pen that is configured of a conductor and that is simply used for touching the touch panel 2 but also a pen that signals can be input into and output from. As described below, a synchronization signal detector circuit 36 is disposed in the stylus pen 3 so that a synchronization signal for synchronization with a dedicated synchronization signal generated by a timing generator 14 of the touch panel controller 10 is received and input into the stylus pen 3.

The touch panel controller 10, as illustrated in FIG. 2, is provided with a multiplexer 11, a driver 12, a sense amplifier 13, the timing generator 14, an AD converter 15, a capacitance distribution calculating unit 16, a touch recognizing unit 17, and a pen position detecting unit 18.

The driver 12 is configured to apply voltage to the drive lines $DL_1$ to $DL_K$ or to the drive lines $DL_1$ to $DL_L$ in correspondence with driving of the horizontal signal lines $HL_1$ to $HL_K$ or the vertical signal lines $VL_1$ to $VL_L$ in the touch panel 2.

The sense amplifier 13 reads a signal of initial charges and a linear summation signal through sense lines $SL_1$ to $SL_K$ and supplies the signal and the linear summation signal to the AD converter 15. The initial charges of the signal correspond to each of the electrostatic capacitances C11 to CKL of the touch panel 2 at the time of driving the horizontal signal lines $HL_1$ to $HL_K$ in a first signal line drive period. The linear summation signal corresponds to a first pen charge signal that is charges at the time of a touch which correspond to the electrostatic capacitances between the stylus pen 3 and each of the L numbers of the vertical signal lines $VL_1$ to $VL_L$ at the time of a touch. That is, when the stylus pen 3 approaches a position on the touch panel 2 while charges corresponding to each of the electrostatic capacitances C11 to CKL are detected in the first signal line drive period, the electrostatic capacitance at the position changes. Thus, the changed electrostatic capacitance can be detected as a linear summation signal. Usually, when the stylus pen 3 approaches the touch panel 2, each of the electrostatic capacitances C11 to CKL at the approached position increases.

The sense amplifier 13 is configured to read a signal of initial charges and a linear summation signal through the sense lines $SL_1$ to $SL_L$ and to supply the signal and the linear summation signal to the AD converter 15. The initial charges of the signal correspond to each of the electrostatic capacitances C11 to CKL of the touch panel 2 at the time of driving the vertical signal lines $VL_1$ to $VL_L$ in a second signal line drive period. The linear summation signal corresponds to a second pen charge signal that is charges at the time of a touch which correspond to the electrostatic capacitances between the stylus pen 3 and each of the K numbers of the horizontal signal lines $HL_1$ to $HL_K$ at the time of a touch.

Figure 4:
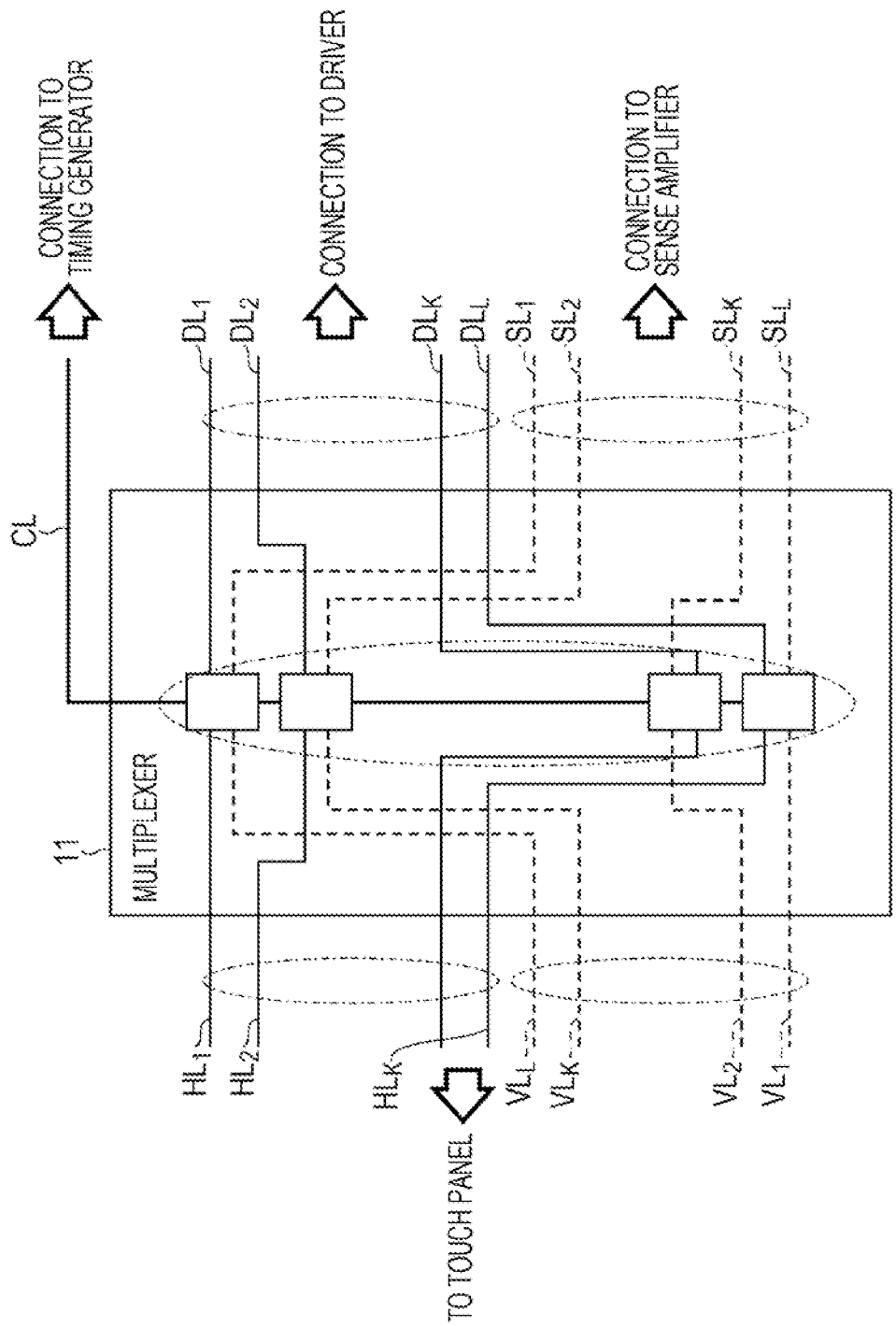
FIG. 4 is a circuit diagram illustrating a configuration of a multiplexer that is used to switch a connection between a signal line connected to the touch panel and a drive line connected to a driver and a connection between the signal line and a sense line connected to a sense amplifier.

Next, the multiplexer 11 will be described on the basis of FIG. 4. FIG. 4 is a circuit diagram illustrating a configuration of a multiplexer that switches connections between the horizontal signal lines $HL_1$ to $HL_K$ or the vertical signal lines $VL_1$ to $VL_K$ to $VL_L$ disposed in the touch panel 2 and the drive lines $DL_1$ to $DL_K$ to $DL_L$ connected to the driver or the sense lines $SL_1$ to $SL_K$ to $SL_L$ connected to the sense amplifier 13.

The multiplexer 11 is a connection switch circuit that switches connections between a plurality of inputs and a plurality of outputs. In the present embodiment, as illustrated in FIG. 4, the multiplexer 11 switches between a first connection state where the horizontal signal lines $HL_1$ to $HL_K$ are connected to the drive lines $DL_1$ to $DL_K$ of the driver 12 and where the vertical signal lines $VL_1$ to $VL_K$ to $VL_L$ are connected to the sense lines $SL_1$ to $SL_K$ to $SL_L$ of the sense amplifier 13 and a second connection state where the horizontal signal lines $HL_1$ to $HL_K$ are connected to the sense lines $SL_1$ to $SL_K$ of the sense amplifier 13 and where the vertical signal lines $VL_1$ to $VL_K$ to $VL_L$ are connected to the drive lines $DL_1$ to $DL_K$ to $DL_L$ of the driver 12.

In the multiplexer 11, when the signal of a control line CL illustrated in FIG. 4 is set to Low, the horizontal signal lines $HL_1$ to $HL_K$ are connected to the drive lines $DL_1$ to $DL_K$, and the vertical signal lines $VL_1$ to $VL_L$ are connected to the sense lines $SL_1$ to $SL_L$. Meanwhile, when the signal of the control line CL is set to High, the horizontal signal lines $HL_1$ to $HL_K$ are connected to the sense lines $SL_1$ to $SL_K$, and the vertical signal lines $VL_1$ to $VL_L$ are connected to the drive lines $DL_1$ to $DL_L$.

Next, the timing generator 14 illustrated in FIG. 2 generates a signal that defines the operation of the driver 12, a signal that defines the operation of the sense amplifier 13, and a signal that defines the operation of the AD converter 15 and respectively supplies the signals to the driver 12, the sense amplifier 13, and the AD converter 15. In addition, the timing generator 14 generates a synchronization signal. The touch panel controller 10 is configured to drive the horizontal signal lines $HL_1$ to $HL_K$ and the vertical signal lines $VL_1$ to $VL_L$ by using the synchronization signal generated by the timing generator 14 as a synchronization-dedicated signal.

Next, the AD converter 15, during the first signal line drive period, performs AD conversion on charges that correspond to each of the electrostatic capacitances C11 to CKL and that are read through the vertical signal lines $VL_1$ to $VL_L$ and through the sense lines $SL_1$ to $SL_L$ and on the linear summation signal that corresponds to the first pen charge signal which is charges corresponding to the electrostatic capacitances between the stylus pen 3 and each of the L numbers of the vertical signal lines $VL_1$ to $VL_L$. The AD converter 15 supplies the AD-converted charges and linear summation signal to the capacitance distribution calculating unit 16.

The AD converter 15, during the second signal line drive period, performs AD conversion on charges that correspond to each of the electrostatic capacitances C11 to CKL and that are read through the horizontal signal lines $HL_1$ to $HL_K$ and through the sense lines $SL_1$ to $SL_K$ and on the linear summation signal that corresponds to the second pen charge signal which is charges corresponding to the electrostatic capacitances between the stylus pen 3 and each of the K numbers of the horizontal signal lines $HL_1$ to $HL_K$. The AD converter 15 supplies the AD-converted charges and linear summation signal to the capacitance distribution calculating unit 16.

Next, the capacitance distribution calculating unit 16, on the basis of the linear summation signal that includes the first pen charge signal and the second pen charge signal and on the basis of a code sequence based on driving, calculates the distribution of electrostatic capacitances on the touch panel 2, the distribution of electrostatic capacitances between the stylus pen 3 and each of the L numbers of the vertical signal lines $VL_1$ to $VL_L$, and the distribution of electrostatic capacitances between the stylus pen 3 and each of the K numbers of the horizontal signal lines $HL_1$ to $HL_K$, supplies the distribution of electrostatic capacitances on the touch panel 2 to the touch recognizing unit 17, and supplies the distribution of electrostatic capacitances between the stylus pen 3 and each of the L numbers of the vertical signal lines $VL_1$ to $VL_L$ and the distribution of electrostatic capacitances between the stylus pen 3 and the K numbers of the horizontal signal lines $HL_1$ to $HL_K$ to the pen position detecting unit 18 that is position detecting means. The touch recognizing unit 17 recognizes the position of a touch on the touch panel 2 on the basis of the distribution of electrostatic capacitances supplied from the capacitance distribution calculating unit 16.

The pen position detecting unit 18 detects the position of the stylus pen 3 along the horizontal signal line $HL_1$ on the basis of the distribution of electrostatic capacitances between the stylus pen 3 and each of the L numbers of the vertical signal lines $VL_1$ to $VL_L$. In addition, the pen position detecting unit 18 detects the position of the stylus pen 3 along the vertical signal line $VL_1$ on the basis of the distribution of electrostatic capacitances between the stylus pen 3 and each of the K numbers of the horizontal signal lines $HL_1$ to $HL_K$.

(Detection Operation for Detecting Position of Touch of Touch Pen)

A detection operation for detecting the position of a touch of the stylus pen 3 in the touch panel system 1 having the above configuration will be described in a temporal manner below. Here, the detection operation will be described in a case where the stylus pen 3 is simply used as a touch pen.

First, in the first signal line drive period, in the first connection state where the horizontal signal lines $HL_1$ to $HL_K$ are connected to the drive lines $DL_1$ to $DL_K$ of the driver 12 and where the vertical signal lines $VL_1$ to $VL_L$ are connected to the sense lines $SL_1$ to $SL_L$ of the sense amplifier 13, the driver 12 drives the horizontal signal lines $HL_1$ to $HL_K$ by applying voltage to the drive lines $DL_1$ to $DL_K$.

Then, in the first signal line drive period, charges that are accumulated in each of the electrostatic capacitances C11 to CKL by driving the horizontal signal lines $HL_1$ to $HL_K$ and L numbers of first linear summation signals that are based on the first pen charge signal which is charges corresponding to the electrostatic capacitances between the stylus pen 3 and each of the L numbers of vertical signal lines $VL_1$ to $VL_L$ at the time of the approach of the stylus pen 3 to the touch panel 2 are output from each of the L numbers of the vertical signal lines $VL_1$ to $VL_L$.

The sense amplifier 13 reads the L numbers of the first linear summation signals that include the first pen charge signal through the multiplexer 11 and through the sense lines $SL_1$ to $SL_L$ and supplies the L numbers of the first linear summation signals to the AD converter 15. The AD converter 15 performs AD conversion on the L numbers of the first linear summation signals that include the first pen charge signal and outputs the AD-converted L numbers of the first linear summation signals to the capacitance distribution calculating unit 16.

Next, the first connection state is switched to the second connection state so as to change the drive signal and the sense signal of the horizontal signal lines $HL_1$ to $HL_K$ and the vertical signal lines $VL_1$ to $VL_L$. That is, in the second connections state, the horizontal signal lines $HL_1$ to $HL_K$ are connected to the sense lines $SL_1$ to $SL_K$ of the sense amplifier 13, and the vertical signal lines $VL_1$ to $VL_L$ are connected to the drive lines $DL_1$ to $DL_L$ of the driver 12.

The driver 12, afterward, drives the vertical signal lines $VL_1$ to $VL_L$ by applying voltage to the drive lines $DL_L$ to $DL_L$.

Then, in the second signal line drive period, charges that are accumulated in each of the electrostatic capacitances C11 to CKL by driving the vertical signal lines $VL_1$ to $VL_L$ and K numbers of second linear summation signals that are based on the second pen charge signal which is charges corresponding to the electrostatic capacitances between the stylus pen 3 and each of the K numbers of the horizontal signal lines $HL_1$ to $HL_K$ are output from each of the K numbers of the horizontal signal lines $HL_1$ to $HL_K$. At this time, the sense amplifier 13 reads the K numbers of the second linear summation signals that include the second pen charge signal through the multiplexer 11 and through the sense lines $SL_1$ to $SL_K$ and supplies the K numbers of the second linear summation signals to the AD converter 15. The AD converter 15 performs AD conversion on the K numbers of the second linear summation signals that include the second pen charge signal and outputs the AD-converted K numbers of the second linear summation signals to the capacitance distribution calculating unit 16.

Next, in a position detecting process, the capacitance distribution calculating unit 16 calculates the distribution of electrostatic capacitances on the touch panel 2 and supplies the first linear summation signals that include the first pen charge signal, the second linear summation signals that include the second pen charge signal, and the distribution of electrostatic capacitances to the touch recognizing unit 17. The capacitance distribution calculating unit 16 calculates the position of the stylus pen 3 along the horizontal signal line $HL_1$ and the position of the stylus pen 3 along the vertical signal line $VL_1$ and supplies the positions of the stylus pen 3 to the pen position detecting unit 18.

The touch recognizing unit 17, afterward, recognizes the position of a touch on the touch panel 2 on the basis of the distribution of electrostatic capacitances supplied from the capacitance distribution calculating unit 16.

The pen position detecting unit 18 detects the position of the stylus pen 3 on the touch panel 2 on the basis of the position of the stylus pen 3 along the horizontal signal line $HL_1$ and the position of the stylus pen 3 along the vertical signal line $VL_1$ calculated by the capacitance distribution calculating unit 16.

In the above description, in the present embodiment, both the horizontal signal lines $HL_1$ to $HL_K$ and the vertical signal lines $VL_1$ to $VL_L$ are driven in a parallel and simultaneous manner. That is, parallel driving is performed. However, not necessarily limited to this, driving of the K numbers of the horizontal signal lines $HL_1$ to $HL_K$ and driving of the L numbers of the vertical signal lines $VL_1$ to $VL_L$ in the touch panel 2 may be either parallel driving or sequential driving. Parallel driving means that the K numbers of the horizontal signal lines $HL_1$ to $HL_K$ or the L numbers of the vertical signal lines $VL_1$ to $VL_L$ are driven in a parallel and simultaneous manner, and sequential driving means that the K numbers of the horizontal signal lines $HL_1$ to $HL_K$ or the L numbers of the vertical signal lines $VL_1$ to $VL_L$ are sequentially driven in order from the horizontal signal line $HL_1$ or from the vertical signal line $VL_1$. Parallel driving is preferable in terms of speed, and the present embodiment uses parallel driving.

As such, the touch panel system 1 of the present embodiment is provided with the touch panel 2 that has electrostatic capacitances formed at each intersection of the plurality of first signal lines and the plurality of second signal lines, the touch pen, and the touch panel controller 10. The touch panel controller 10, when repeatedly performing switched driving such that the horizontal signal lines $HL_1$ to $HL_K$ that are the plurality of first signal lines are driven to output charge signals based on each electrostatic capacitance from each of the vertical signal lines $VL_1$ to $VL_L$ that are the second signal lines during the first signal line drive period and such that the vertical signal lines $VL_1$ to $VL_L$ that are the plurality of second signal lines are driven to output charge signals based on each electrostatic capacitance from each of the horizontal signal lines $HL_1$ to $HL_K$ that are the first signal lines during the second signal line drive period, detects the position of a touch on the basis of a change in electrostatic capacitance due to the touch pen when the touch pen touches the touch panel 2.

In the touch pen coordinate position detecting method in the touch panel system 1 having the above configuration, when the touch pen touches the touch panel 2, a detected position in the first signal line drive period and a detected position in the second signal line drive period are represented at the same position. Meanwhile, an erroneous signal due to phantom noise that is caused by the touch of a hand, a finger, and the like of a human body, which receives electromagnetic noise, on the touch panel 2, even when represented in the first signal line drive period by switching the first signal lines and the second signal lines, is not represented at the same position in the second signal line drive period. Therefore, by determining a detected position with a logical product of a detected position in the first signal line drive period and a detected position in the second signal line drive period, it is possible to distinguish a signal of a touch of the touch pen and an erroneous signal due to phantom noise and to remove the erroneous signal due to phantom noise.

Phantom noise is a noise that generates a detection signal based on static electricity at a position different from the position of a touch of the touch pen through a hand which holds the touch pen. Since the position where the detection signal is generated is different from the valid position of a touch of the touch pen, the detection signal is regarded as noise.

(Configuration of Stylus Pen and Pen Pressure Sensing Function)

The stylus pen 3 of the present embodiment, for example, includes a pen pressure sensor that is used to detect the pressure of a pen. A pen pressure signal from the pen pressure sensor is configured to be output in synchronization with the touch panel controller 10. However, not necessarily limited to this, the stylus pen 3 may not include a pen pressure sensor that is used to detect the pressure of a pen.

Figure 5:
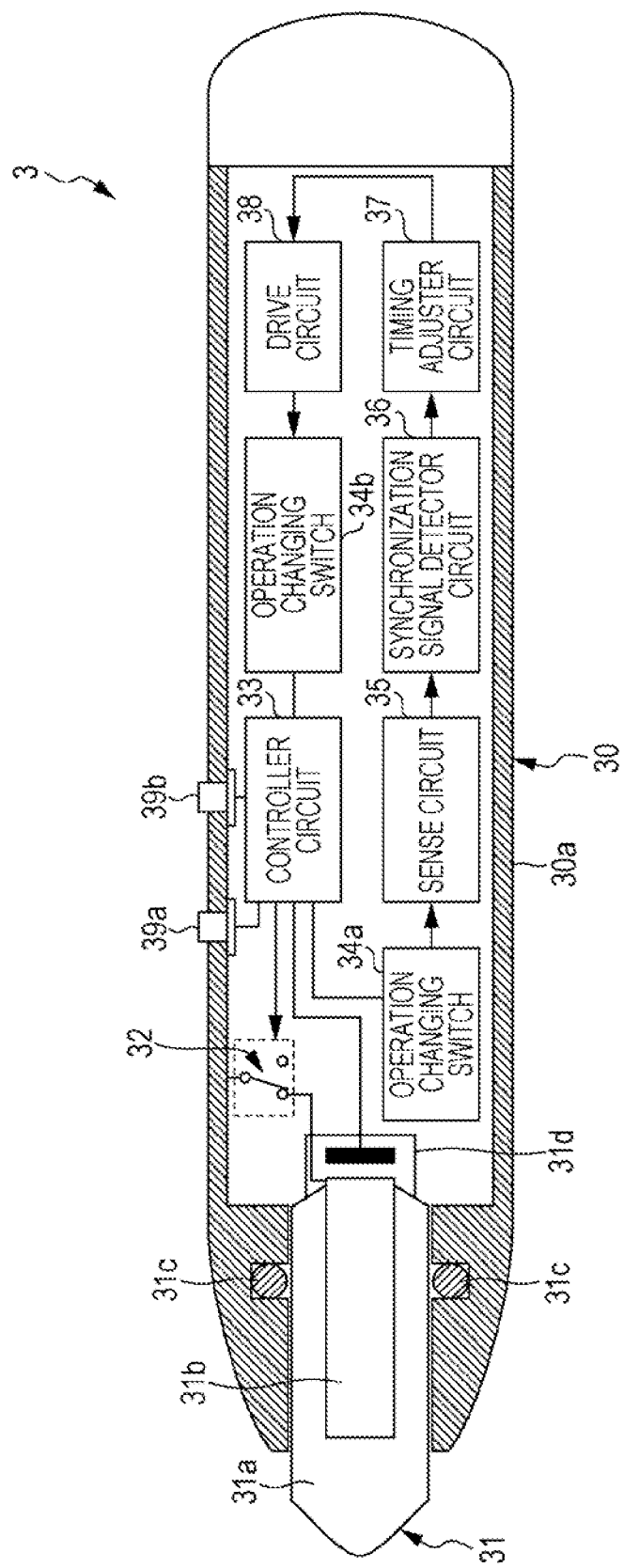
FIG. 5 is a block diagram illustrating a configuration of the stylus pen in the touch panel system.

A configuration of the stylus pen 3 will be described on the basis of FIG. 5. FIG. 5 is a sectional view illustrating a configuration of the stylus pen 3.

The stylus pen 3, as illustrated in FIG. 5, includes a pen main body 30 that a user holds with the hand thereof and that includes a conductive holding portion 30a which is formed into a substantially cylindrical shape so that the user can hold with the hand thereof. A pen tip portion 31 that is pressed to the touch panel 2 at the time of a touch operation is disposed at the tip end of the pen main body 30.

The pen tip portion 31 includes a pen tip cover 31a, a pen tip axis 31b, insulators 31c and 31c that hold the pen tip cover 31a in a manner capable of moving the pen tip cover 31a forward in the axial direction, and a pen pressure sensor 31d that is disposed on the deep side of the pen tip axis 31b.

The pen tip cover 31a is made of insulating material, and the pen tip axis 31b is made of conductive material such as metal or conductive synthetic resin material.

The pen pressure sensor 31d is configured of, for example, a semiconductor piezoresistive pressure sensor in which a semiconductor strain gauge is formed on the surface of an unillustrated diaphragm. Therefore, when the pen tip cover 31a of the pen tip portion 31 is pressed to the touch panel 2 at the time of a touch operation, the pen tip axis 31b is pushed through the pen tip cover 31a and presses the surface of the diaphragm of the pen pressure sensor 31d. Accordingly, a change in electrical resistance due to a piezoresistive effect that is generated by the deformation of the diaphragm is converted into an electrical signal. Accordingly, the pressure of the stylus pen 3 can be detected. A principle of detecting the pressure of a pen is not necessarily limited to this. Other principles of detection can be used.

Disposed in the pen main body 30 are a connection switch 32, a controller circuit 33, operation changing switches 34a and 34b, a sense circuit 35, the synchronization signal detector circuit 36, a timing adjuster circuit 37, and a drive circuit 38. The connection switch 32 may be omitted. When the connection switch 32 is omitted, the output of the controller circuit 33 is connected to the pen tip axis 31b.

The connection switch 32 is an electronic switch that is configured of a field-effect transistor (FET) or the like and is controlled in an ON-OFF manner by the controller circuit 33. When the connection switch 32 is OFF, the pen tip cover 31a is electrically disconnected from the holding portion 30a of the pen main body 30. At this time, since the component capacitance of the pen tip portion 31 is very small, the touch panel system 1 does not recognize approaching or abutting of the stylus pen 3 even when the pen tip cover 31a approaches the touch panel 2.

Meanwhile, when the connection switch 32 is ON, the pen tip cover 31a is electrically connected to the holding portion 30a of the pen main body 30 through the pen tip axis 31b, and a human body is conducted to the pen tip cover 31a through the holding portion 30a. Accordingly, since a human body has a comparatively large electrostatic capacitance, when the stylus pen 3 approaches or touches the touch panel 2, charges accumulated in each of the electrostatic capacitances C11 to CKL of the touch panel 2 change, and the touch panel system 1 can detect the state of the touch of the stylus pen 3.

Disposed in the stylus pen 3 are, for example, a push-type first operating switch 39a and a push-type second operating switch 39b. Functions assigned to the first operating switch 39a and the second operating switch 39b are performed through the controller circuit 33 by pushing the first operating switch 39a and the second operating switch 39b. Examples of a function assigned to the first operating switch 39a can include an eraser function. The first operating switch 39a can turn ON or OFF the eraser function. In addition, examples of a function assigned to the second operating switch 39b can include a mouse right-clicking function. The second operating switch 39b can turn ON or OFF the mouse right-clicking function.

The eraser function and the mouse right-clicking function are merely an example. The functions of the first operating switch and the second operating switch are not limited to the eraser function and the mouse right-clicking function. It is also possible to further dispose other operating switches to add other functions.

A signal of a touch of the stylus pen 3 on the touch panel 2, that is, the first pen charge signal and the second pen charge signal indicating the position of a touch are detected by switching driving of the horizontal signal lines $HL_1$ to $HL_K$ and the vertical signal lines $VL_1$ to $VL_L$ as described above when the stylus pen 3 touches the touch panel 2 in a state where the connection switch 32 of the stylus pen 3 is ON.

In order to detect driving of the pen tip portion 31 of the stylus pen 3 with the touch panel controller 10, the present embodiment uses a method that matches the drive pattern of the drive circuit 38 of the stylus pen 3 to the drive pattern of the horizontal signal line $HL_{K+1}$ (or later one) of the touch panel 2 driven by the touch panel controller 10, that is, to the drive pattern of the (K+1)-th (or later) drive line $DL_{K+1}$ (or later one) of the driver 12 in the first signal line drive period and matches the drive pattern of the drive circuit 38 to the drive pattern of the vertical signal line $VL_{L+1}$ (or later one) of the touch panel 2 driven by the touch panel controller 10, that is, to the drive pattern of the (L+1)-th (or later) drive line $DL_{L+1}$ (or later one) of the driver 12 in the second signal line drive period. Here, the horizontal signal line $HL_{K+1}$ (or later one) and the vertical signal line $VL_{L+1}$ (or later one) do not actually exist.

In FIG. 2 and FIG. 3, although drive patterns may be different depending on the drive periods such as the drive line $DL_{K+1}$ or the drive line $DL_{L+1}$ (K≠L), the drive line $DL_{K+1}$ and the drive line $DL_{L+1}$ are displayed by a phantom line using the representation of the drive line $DL_{L+1}$ for convenience of representation. The representation of the drive line $DL_{L+1}$ will also be used in later descriptions.

(Basic Operation of Synchronization of Touch Panel Controller and Stylus Pen)

The stylus pen 3 of the present embodiment wirelessly transmits and receives signals with the touch panel controller 10. Therefore, the pen tip portion 31 is driven with the same pattern as driving the drive line $DL_{L+1}$ in accordance with the timing of driving the drive lines $DL_1$ to $DL_L$ in the touch panel controller 10. Therefore, the drive circuit 38 is disposed in the stylus pen 3 so that the stylus pen 3 can be driven in the same manner as the driver 12 of the touch panel controller 10.

Driving of the drive lines $DL_1$ to $DL_L$ in the touch panel controller 10 is based on a drive timing that is generated by the timing generator 14. Thus, the stylus pen 3 has to operate in synchronization with the timing when the touch panel controller 10 is driven. Therefore, by disposing the sense circuit 35, the synchronization signal detector circuit 36, and the timing adjuster circuit 37 in the stylus pen 3 of the present embodiment, the dedicated synchronization signal that the touch panel controller 10 drives is detected in the stylus pen 3, and the timing of the dedicated synchronization signal of the touch panel controller 10 is matched to the timing of a pen synchronization signal that is generated by the timing adjuster circuit 37 of the stylus pen 3.

Figure 6:
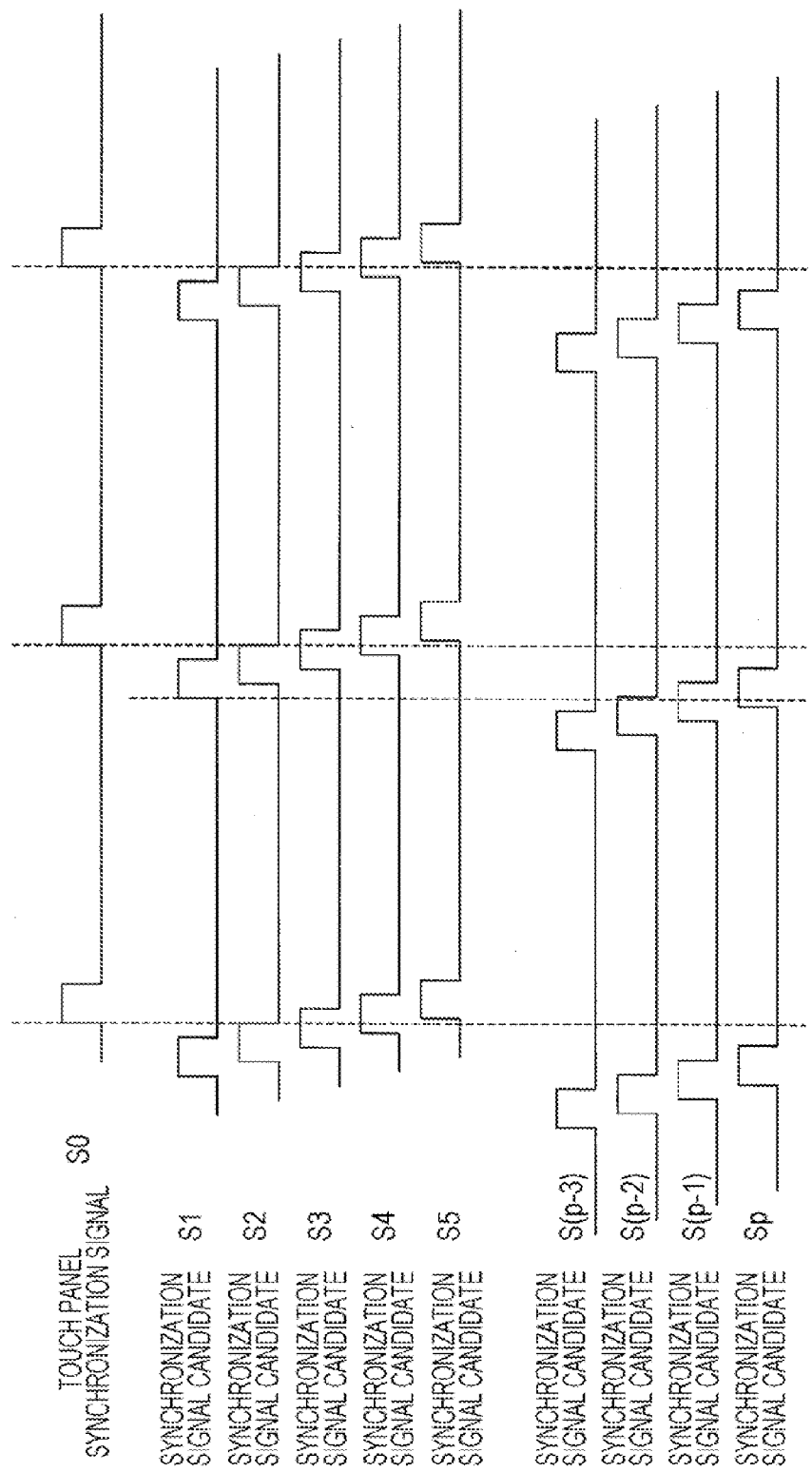
FIG. 6 is a timing chart illustrating a basic operation that is performed to synchronize the stylus pen.

A basic principle of the synchronization of the stylus pen 3 in the touch panel system 1 will be described on the basis of FIG. 6. FIG. 6 is a timing chart illustrating the basic principle of synchronization.

The stylus pen 3 detects the dedicated synchronization signal generated by the timing generator 14 of the touch panel controller 10 with the sense circuit 35 and the synchronization signal detector circuit 36. The dedicated synchronization signal is assumed to be a single pulse for simplification.

As illustrated in FIG. 6, it is assumed that a touch panel synchronization signal S0 that is the dedicated synchronization signal configured of a single pulse is generated in a constant cycle.

The sense circuit 35 of the stylus pen 3 generates a plurality of synchronization signal candidates S1 to Sp (p is an integer greater than or equal to two). The synchronization signal candidate Sp illustrated in FIG. 6 represents a signal that is delayed by approximately one cycle from the synchronization signal candidate S1. The stylus pen 3 selects a synchronization signal that has a high degree of matching with the dedicated synchronization signal transmitted from the timing generator 14 of the touch panel controller 10 from the synchronization signal candidates S1 to Sp and uses the synchronization signal as a synchronization signal for communication with the touch panel controller 10. In the example illustrated in FIG. 6, the synchronization signal candidate S4 or S5 that has a high degree of matching with the touch panel synchronization signal S0 is used as the pen synchronization signal of the stylus pen 3.

The stylus pen 3 is in a detection mode until being synchronized, and the drive circuit 38 is not driven.

According to such a principle, the stylus pen 3 can synchronize with the dedicated synchronization signal of the touch panel controller 10.

(Characteristic Operation of Synchronization of Touch Panel Controller and Stylus Pen)

In actuality, synchronization is not easy because noise exists in the reception of the dedicated synchronization signal from the touch panel controller 10. Specifically, since a low-frequency component is superimposed on the dedicated synchronization signal, it is difficult to correctly obtain the amplitude of the pulse of the dedicated synchronization signal. As a consequence, a problem arises in that the pulse of the dedicated synchronization signal may not be captured.

Figure 7:
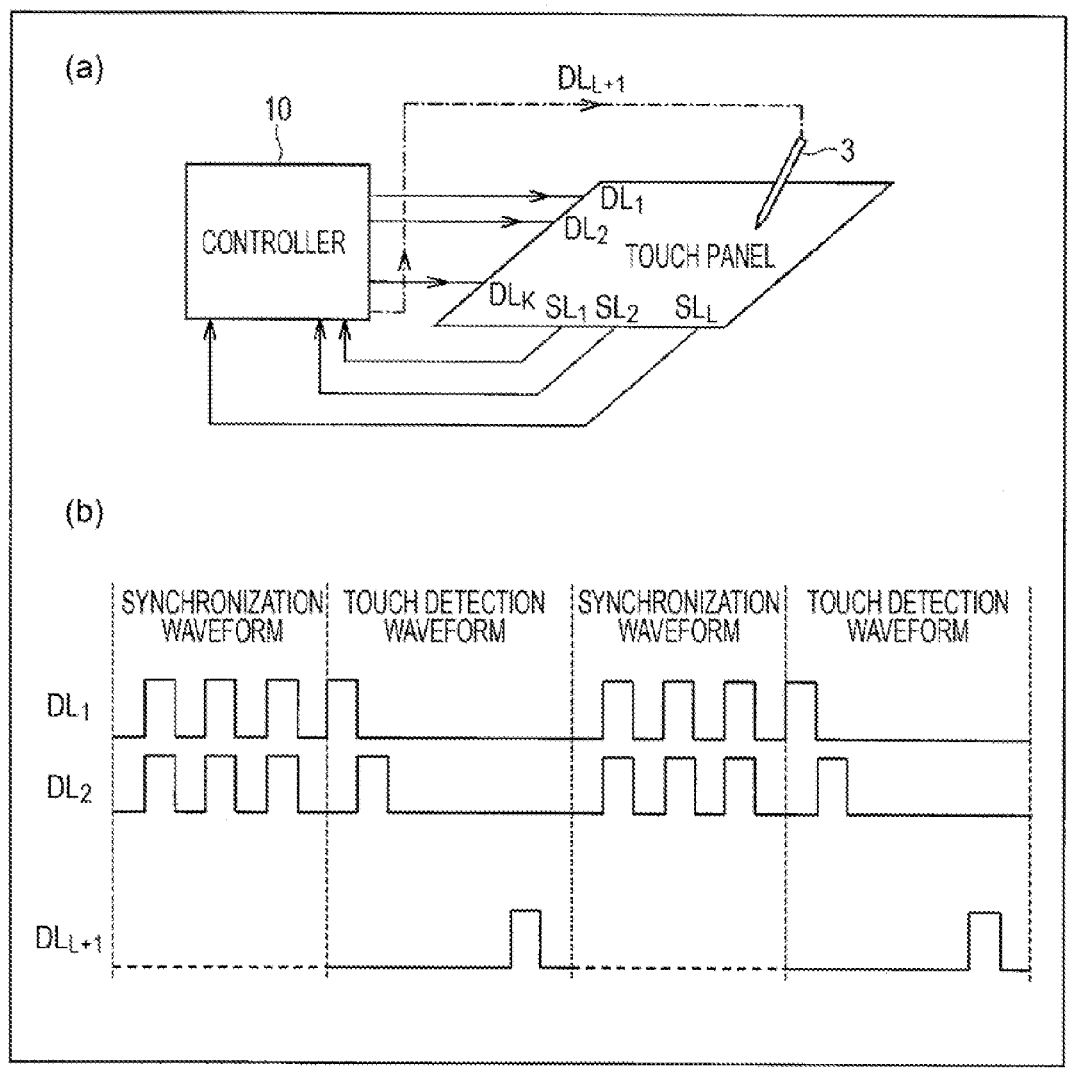
FIG. 7(a) is a diagram illustrating an output relationship between the drive line of the driver and the sense line of the sense amplifier in the touch panel controller to the touch panel and the stylus pen.
FIG. 7(b) is a waveform diagram illustrating a synchronization waveform and a touch detection waveform.
Figure 8:
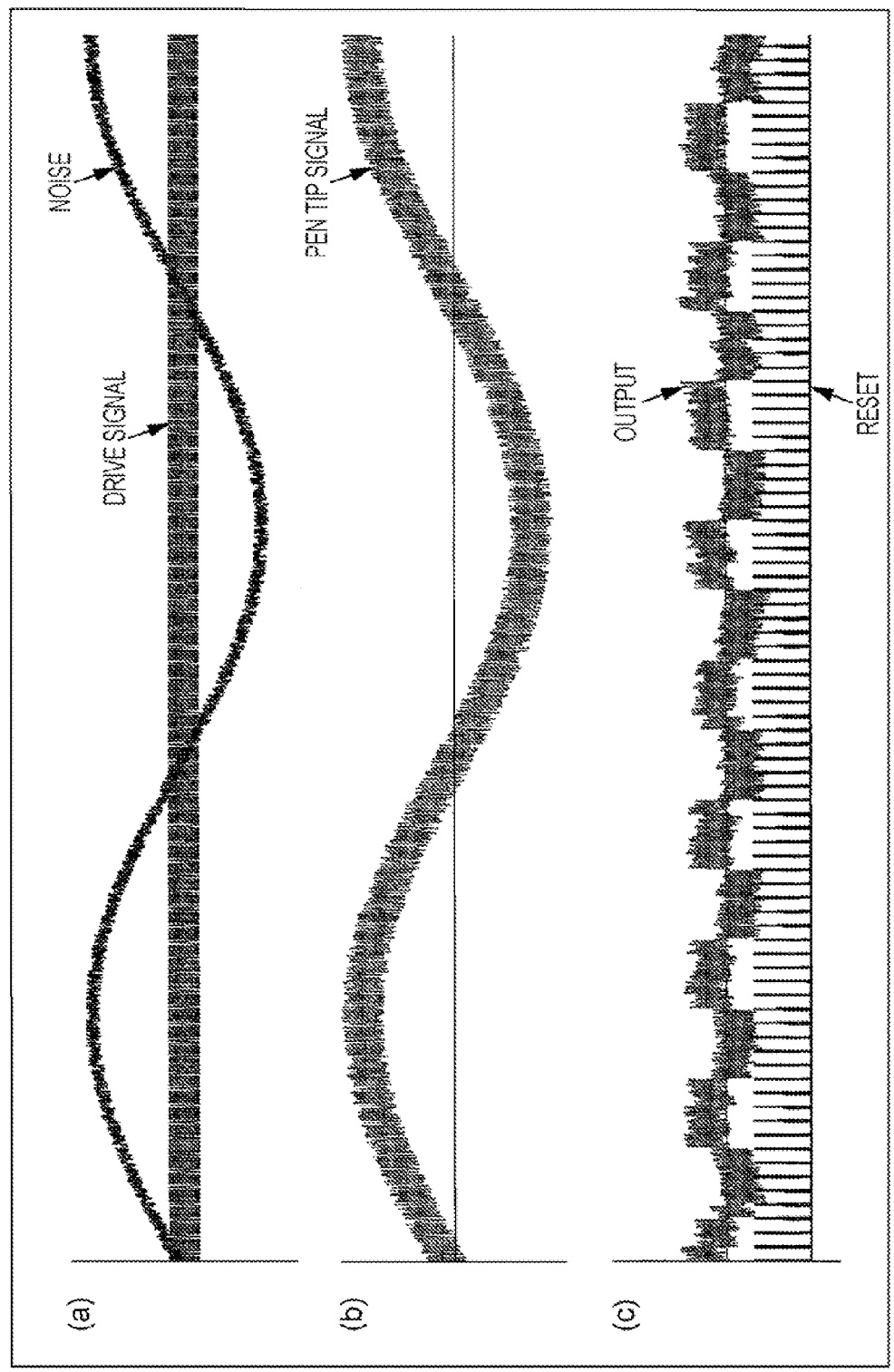
FIG. 8(a) is a waveform diagram illustrating a drive waveform, such as a synchronization waveform and a touch detection waveform transmitted from the touch panel controller to the stylus pen, and a low-frequency noise.
FIG. 8(b) is a waveform diagram illustrating a state where the drive waveform and the low-frequency noise are superimposed.
FIG. 8(c) is a waveform diagram illustrating a state where the superimposed waveform is reset at reset timings.
Figure 9:
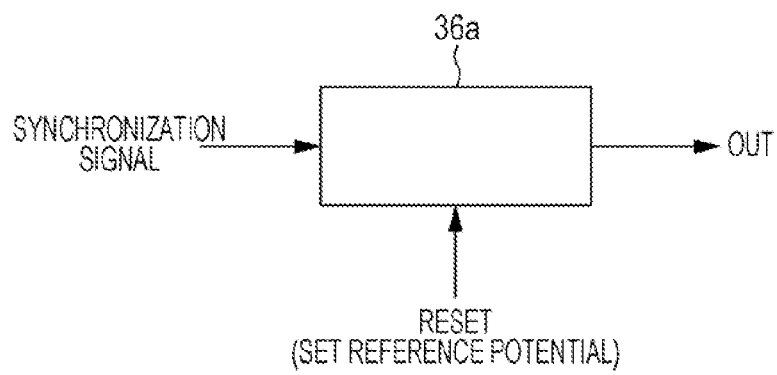
FIG. 9 is a diagram illustrating a configuration of a reset circuit provided in a synchronization signal detector circuit of the stylus pen.
Figure 10:
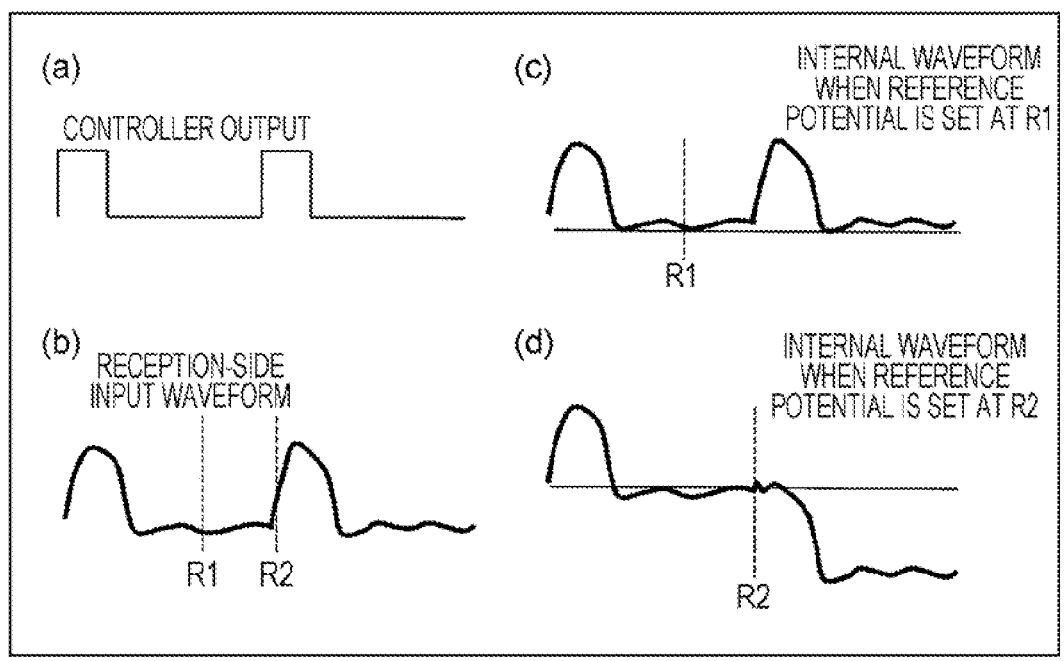
FIG. 10(a) is a waveform diagram illustrating an example of a synchronization waveform transmitted from the touch panel controller.
FIG. 10(b) is a waveform diagram illustrating an input waveform received by the stylus pen.
FIG. 10(c) is a waveform diagram illustrating an internal waveform when a reference potential is set at a reset timing R1 in FIG. 10(b)
FIG. 10(d) is a waveform diagram illustrating an internal waveform when a reference potential is set at a reset timing R2 in FIG. 10(b).
Figure 11:
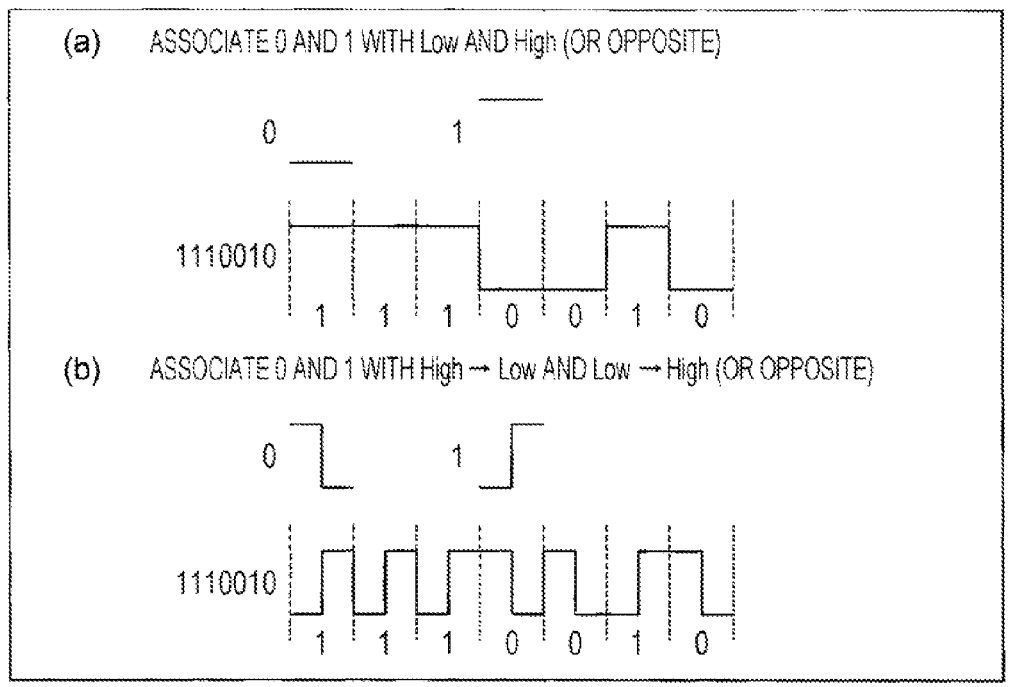
FIG. 11(a) is a waveform diagram illustrating a synchronization waveform that uses the M-sequence code "1110010" which is not Manchester-coded.
FIG. 11(b) is a waveform diagram illustrating a synchronization waveform that uses the Manchester-coded M-sequence code "1110010".
Figure 12:
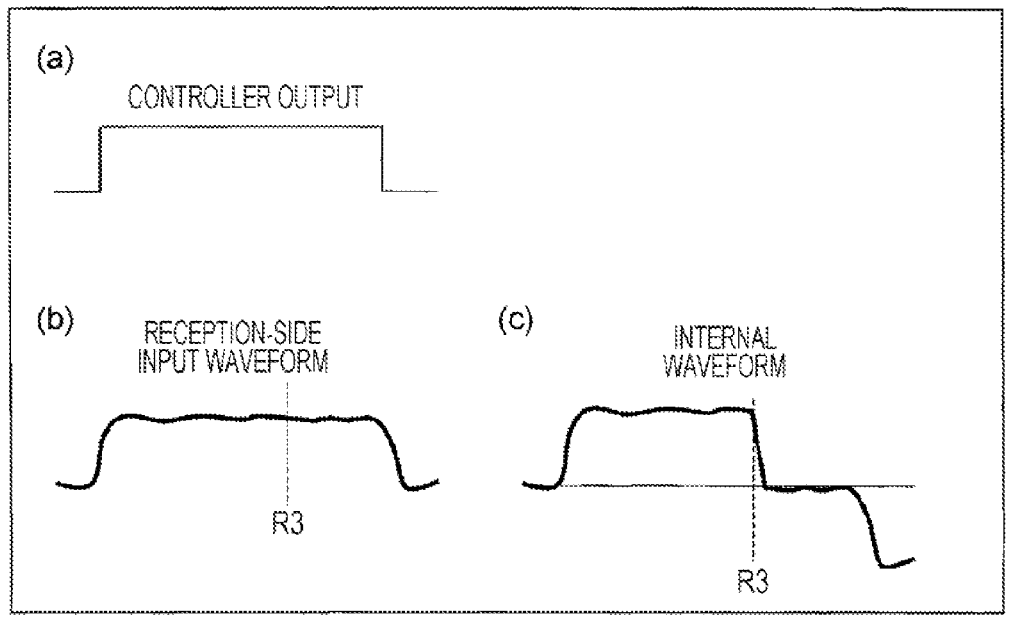
FIG. 12(a) is a waveform diagram illustrating an example of a synchronization waveform that has a long High period and is transmitted from the touch panel controller.
FIG. 12(b) is a waveform diagram illustrating a reset timing R3 of an input waveform received by the stylus pen.
FIG. 12(c) is a waveform diagram illustrating an internal waveform when a reference potential is set at the reset timing R3 in FIG. 12(b).

An example of a method for resolving such a problem will be described on the basis of FIGS. 1(a) and 1(b) and FIG. 7(a) to FIG. 12(c). FIG. 1(a) is a diagram illustrating a synchronization waveform of a pseudorandom sequence that has periodicity, is Manchester-coded, and is transmitted to the stylus pen from the touch panel controller of the touch panel system, and FIG. 1(b) is a waveform diagram illustrating the synchronization waveform and a touch detection waveform. FIG. 7(a) is a diagram illustrating an output relationship between the drive line of the driver and the sense line of the sense amplifier in the touch panel controller to the touch panel and the stylus pen, and FIG. 7(b) is a waveform diagram illustrating a synchronization waveform and a touch detection waveform. FIG. 8(a) is a waveform diagram illustrating a drive waveform, such as a synchronization waveform and a touch detection waveform transmitted from the touch panel controller to the stylus pen, and a low-frequency noise, FIG. 8(b) is a waveform diagram illustrating a state where the drive waveform and the low-frequency noise are superimposed, and FIG. 8(c) is a waveform diagram illustrating a state where the superimposed waveform is reset at reset timings. FIG. 9 is a diagram illustrating a configuration of a reset circuit disposed in the synchronization signal detector circuit of the stylus pen. FIG. 10(a) is a waveform diagram illustrating an example of a synchronization waveform transmitted from the touch panel controller, FIG. 10(b) is a waveform diagram illustrating an input waveform received by the stylus pen, FIG. 10(c) is a waveform diagram illustrating an internal waveform when a reference potential is set at a reset timing R1 in FIG. 10(b), and FIG. 10(d) is a waveform diagram illustrating an internal waveform when a reference potential is set at a reset timing R2 in FIG. 10(b). FIG. 11(a) is a waveform diagram illustrating a synchronization waveform that uses the M-sequence code "1110010" which is not Manchester-coded, and FIG. 11(b) is a waveform diagram illustrating a synchronization waveform that uses the Manchester-coded M-sequence code "1110010". FIG. 12(a) is a waveform diagram illustrating an example of a synchronization waveform that has a long High period and is transmitted from the touch panel controller, FIG. 12(b) is a waveform diagram illustrating a reset timing R3 of an input waveform received by the stylus pen, and FIG. 12(c) is a waveform diagram illustrating an internal waveform when a reference potential is set at the reset timing R3 in FIG. 12(b).

In the touch panel system 1 of the present embodiment, as illustrated in FIG. 7(a), the dedicated synchronization signal of the touch panel controller 10 is created in the timing generator 14 of the touch panel controller 10 and is transmitted by the driver 12 using the drive lines $DL_1$ to $DL_L$. As a mechanism that notifies the stylus pen 3 of the dedicated synchronization signal which is the drive timing of the touch panel controller 10, as illustrated in FIG. 7(b), the drive lines $DL_1$ to $DL_L$ are driven by a waveform that represents synchronization separately from a normal touch detection waveform. Specifically, the touch detection waveform is generated after the synchronization waveform is generated in each of the drive lines $DL_1$ to $DL_L$. For easy understanding of description, the touch detection waveform is generated by sequential driving. In addition, representing the generation of the synchronization waveform with a plurality of continuous pulses is to facilitate distinguishing the appearance of the synchronization waveform from the waveform of sequential driving. In actuality, a waveform obtained by Manchester-coding the M-sequence code suggested in the present embodiment or the like is more likely to be detected as a synchronization waveform.

Various types of noise, particularly low-frequency noise, are mixed into the waveform of a signal received by the stylus pen 3. In FIG. 8(a), it is assumed that a wide straight line illustrates the dedicated synchronization waveform that is configured of a plurality of dense pulses which the touch panel controller 10 drives and that a sin curve illustrates noise.

The waveform of the signal received by the stylus pen 3 is configured of the superimposition of the synchronization waveform obtained from the touch panel controller 10 and low-frequency noise as illustrated in FIG. 8(b). As a consequence, in the waveform of the signal received by the stylus pen 3, the amplitude of low-frequency noise is larger than the amplitude of the synchronization waveform obtained from the touch panel controller 10. Thus, when using the waveform of the received signal from the minimum potential to the maximum potential thereof, it is difficult to obtain the synchronization waveform signal because the amplitude of the synchronization waveform signal is a relatively minute amplitude in comparison with the noise.

Therefore, as a method for finding the synchronization waveform from the waveform illustrated in FIG. 8(b) in which the synchronization waveform and low-frequency noise are superimposed, for example, there are a method of removing low-frequency noise with a low frequency cut-off filter and a method of performing a reset operation that sets a reference potential for the waveform in which the synchronization waveform and low-frequency noise are superimposed and obtaining the amplitude of an internal waveform by using the potential difference from the reference potential. However, low frequency cut-off filters are expensive.

In the present embodiment, thus, the stylus pen 3 that is on the reception side of the synchronization waveform uses the method of performing a reset operation that sets a reference potential for the received input waveform and obtaining the amplitude of an internal waveform by using the potential difference from the reference potential. However, the present invention is not necessarily limited to this. It is also possible to remove noise that is configured of low-frequency components by using a low frequency cut-off filter.

In the present embodiment, the synchronization signal detector circuit 36 of the stylus pen 3 is provided with a reset circuit 36a illustrated in FIG. 9 so as to perform a reset operation that sets a reference potential for the received input waveform. The reset circuit 36a resets the superimposed signal waveform illustrated in FIG. 8(b) in which the synchronization waveform obtained from the touch panel controller 10 and low-frequency noise are superimposed. By resetting the superimposed signal waveform, the superimposed signal waveform returns to the reference potential at a reset timing as illustrated in FIG. 8(c). That is, the reference potential is set to the same potential as the input signal. Then, a positive potential is output when the potential of the superimposed signal waveform input is higher than the reference potential, while a negative potential is output when the potential of the superimposed signal waveform input is lower than the reference potential. Accordingly, it is possible to remove low-frequency components and to keep the amplitude of the signal within a certain range.

When a reset operation that sets a reference potential for the received input waveform is performed on the synchronization waveform that is obtained from the touch panel controller 10 and that is represented by a sequence of a plurality of equidistant pulses, a problem arises in that it is difficult to identify the dedicated synchronization signal that is the drive timing of the touch panel controller 10 because pulses are not captured when the reset timing that sets a reference potential for the reception-side stylus pen 3 overlaps with the pulses of the synchronization waveform.

When, for example, the synchronization waveform illustrated in FIG. 10(a) is transmitted from the touch panel controller 10, an input waveform in the reception-side stylus pen 3 is illustrated by the waveform of FIG. 10(b). At this time, the internal waveform when the reference potential is set at the reset timing R1 in the waveform of FIG. 10(b) is illustrated in FIG. 10(c). However, when the reset timing R2 is set to the second pulse in the waveform of FIG. 10(b), the internal waveform when the reference potential is set is as illustrated in FIG. 10(d). As a consequence, since the second pulse does not have a positive rise, the second pulse is not captured. That is, it is difficult to identify the dedicated synchronization signal that is the drive timing of the touch panel controller 10.

The present embodiment, therefore, uses a constant pattern synchronization signal that is configured of a pseudorandom sequence having periodicity as a synchronization waveform that is transmitted by the touch panel controller 10. Specifically, an M-sequence code or a Gold sequence code is used.

The pseudorandom sequence is a code sequence that is used in a pseudorandom signal which is an artificially created random signal. That is, while actual random signals existing in nature are usually called a random signal, artificially created random signals are called a pseudorandom signal. Although a certain rule is necessary since the pseudorandom signal is artificially created, various considerations are made to make the statistical properties of the created signal as close as possible to the statistical properties of the actual random signal. Usually, considerations are made to make the autocorrelation function of the created signal as close as possible to the autocorrelation function $\delta(t)$ of white noise. The pseudorandom signal is created by associating a pseudorandom sequence (a sequence of numbers) with physical quantities such as voltage. Types of pseudorandom sequences include a finite length sequence and a periodic sequence. Periodic sequences are widely used in terms of ease of generation and usage. There are an M-sequence and a Gold sequence that represent the periodic sequence.

The autocorrelation of an M-sequence signal and a Gold sequence code shows a very sharp peak and has properties such that the correlation values with others except for the M-sequence signal and the Gold sequence code are very small. The M-sequence and the Gold sequence are sequences that are configured of binary numbers of zero and one and that have periodicity in which binary sequences are connected.

The reliability of determining synchronization is increased by using the M-sequence code or Gold sequence code as a synchronization waveform transmitted by the touch panel controller 10 even when the reset timing overlaps with one pulse because pulses that match the M-sequence code are determined as a correct synchronization timing.

When, for example, the M-sequence code "1110010" is used as illustrated in FIG. 11(a), the synchronization waveform illustrated in FIG. 11(a) can be obtained by associating "0" with Low of the synchronization waveform and associating "1" with High of the synchronization waveform.

As described above, tolerance to pulses not being captured is increased by using the M-sequence code as a synchronization waveform transmitted by the touch panel controller 10 and by determining whether pulses match the same M-sequence code in the sense circuit 35 and the synchronization signal detector circuit 36 of the stylus pen 3. However, when the sequence is long, the sequence includes a pattern in which the number of continuous Highs or Lows is large. Thus, when the reset timing that sets a reference potential is set in this part, an unnecessary potential change occurs to make the determination of a waveform difficult.

For example, an internal waveform when there are High pulses in a long period in the synchronization waveform transmitted by the touch panel controller 10 as illustrated in FIG. 12(a) and when a reference potential is set at the reset timing R3 in the input waveform received by the stylus pen 3 illustrated in FIG. 12(b) becomes as illustrated in FIG. 12(c), and it is difficult to detect the internal waveform.

Therefore, the present embodiment uses a waveform that is obtained by Manchester-coding a code having good autocorrelation characteristics such as the M-sequence, and the waveform is driven as the synchronization waveform of the touch panel controller 10. The Manchester-coded waveform means associating "0" with High→Low of the synchronization waveform and associating "1" with Low→High of the synchronization waveform as illustrated in FIG. 11(b). The opposite may also be possible. Accordingly, as illustrated in FIG. 11(b), it is possible to prevent the occurrence of a case where the period of High or Low is long when the M-sequence code "1110010" is used.

As such, considering the reset operation, it is preferable that the Manchester-coded M-sequence code or Gold sequence code is used.

In the present embodiment, as illustrated in FIG. 1(a), for example, the above 7-bit M-sequence code "1110010" that is Manchester-coded is used to associate pulses as illustrated in FIG. 1(a). Then, the pulses are used as a synchronization waveform of the touch panel controller 10 as illustrated in FIG. 1(b).

Accordingly, a period of long continuous Highs or Lows does not appear in the synchronization waveform, and it is possible to use a synchronization pattern of which the autocorrelation characteristics facilitate the detection of the synchronization pattern. In addition, since High or Low is continuous at most during a time that represents one bit in the synchronization waveform, it is also possible to adjust the reset timing that sets a reference potential by the reception-side stylus pen 3.

For example, when a state where potential is high continues for the time that represents one bit or longer, this is regarded as the influence of noise, and the potential at that point in time is set for a later reference potential. In addition, when the state changes from the high potential close to the reference potential, the potential at that point in time is set for a later reference potential. Accordingly, even when potential significantly decreases due to noise and the like, it is possible to track the potential.

(Continuous Operation of Synchronization of Touch Panel System and Stylus Pen and Touch Position Detection)

Figure 13:
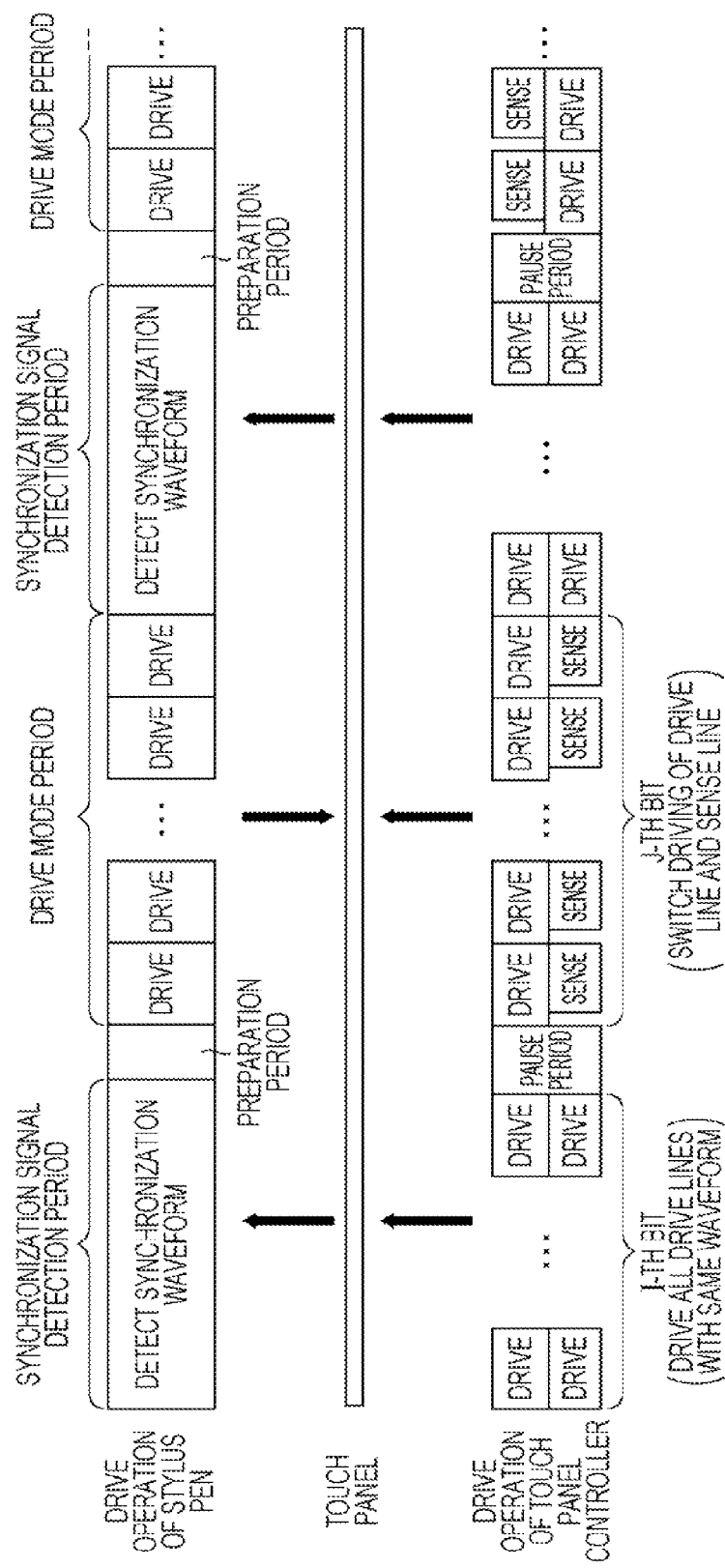
FIG. 13 is an operation image diagram illustrating a correspondence between a drive operation of the touch panel controller and a drive operation of the stylus pen.
Figure 14:
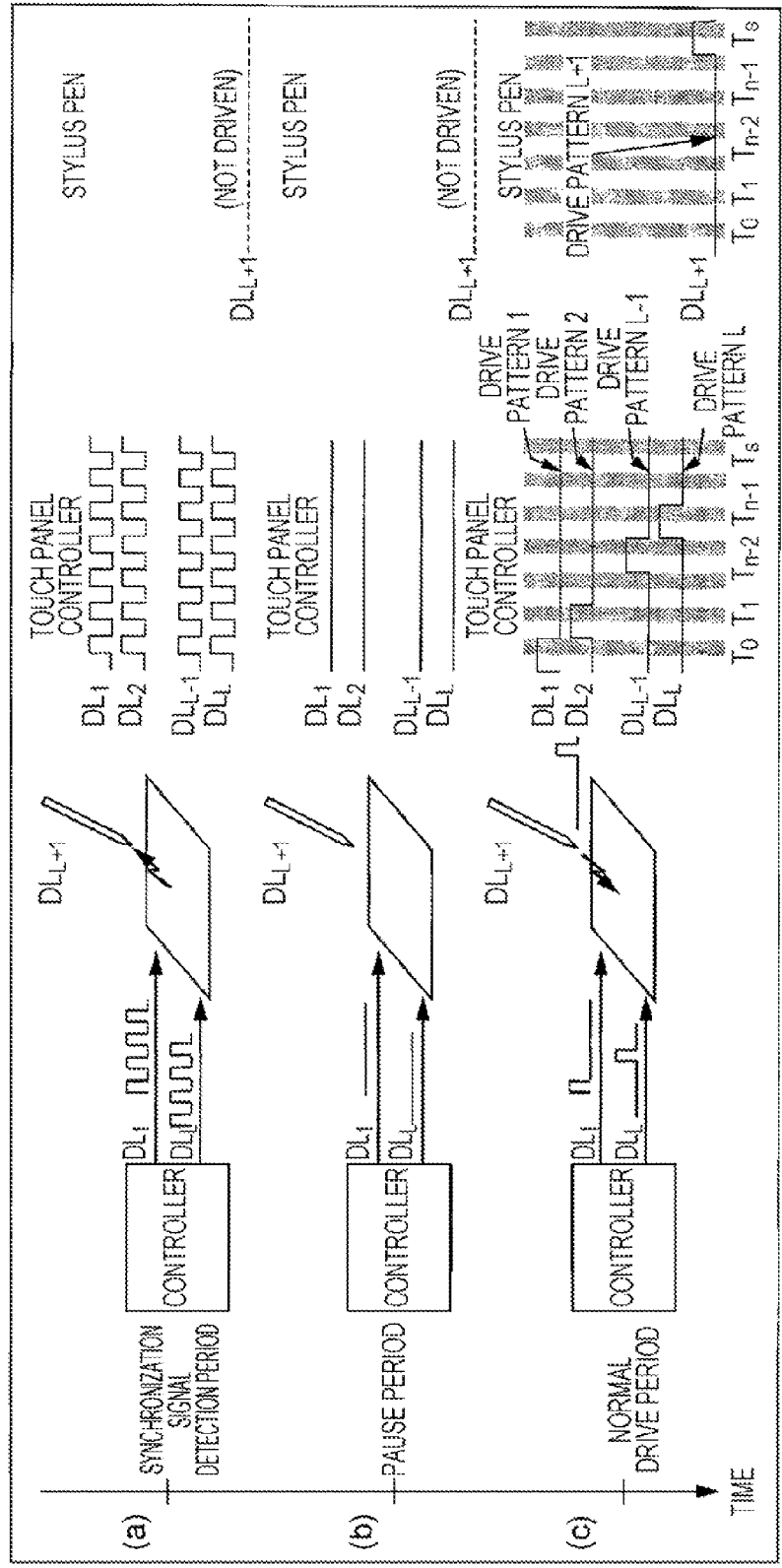
FIGS. 14(a) to 14(c) are diagrams illustrating a specific drive operation in a synchronization signal detection period, a pause period, and a normal drive period illustrated in FIG. 13.

Continuous operation of the synchronization of the touch panel system 1 and the stylus pen 3 having the above configurations and touch position detection will be described on the basis of FIG. 13 and FIGS. 14(a) to 14(c). FIG. 13 is an operation image diagram illustrating a correspondence between a drive operation of the touch panel controller 10 and a drive operation of the stylus pen 3. FIGS. 14(a) to 14(c) are diagrams illustrating a specific drive operation in a synchronization signal detection period, a pause period, and a normal drive period illustrated in FIG. 13.

The drive operation of the stylus pen 3, as illustrated in FIG. 13, is configured by repeating three periods of a synchronization signal detection period that is set for detecting the synchronization signal from the touch panel controller 10 with the sense circuit 35 and the synchronization signal detector circuit 36 by turning the operation changing switch 34a ON and by turning the operation changing switch 34b OFF, a preparation period, and a drive mode period during which the drive circuit 38 drives the pen tip portion 31 by turning the operation changing switch 34a OFF and by turning the operation changing switch 34b ON.

The synchronization signal detection period is a standby period for detecting a bit pattern that represents the synchronization waveform and is a period during which the synchronization signal pattern is detected from a pen tip signal waveform while the pen tip portion 31 is not driven. Specifically, in the synchronization signal detection period, as illustrated in FIG. 14(a), each of the drive lines $DL_1$ to $DL_L$ of the driver 12 is driven with the same waveform. The pattern of the waveform used includes a pattern that has autocorrelation characteristics such as the M-sequence.

The preparation period illustrated in FIG. 13 is a preparation period for selecting a code to drive on the basis of additional information after the detection of the synchronization signal pattern and on the basis of the state of the stylus pen 3 and for starting to drive the pen tip in accordance with the timing of the touch panel controller 10 and is a period during which the additional information that includes the timing of starting driving is interpreted.

The drive mode period is a period during which the pen tip portion 31 is driven by the drive circuit 38 and is a period during which the pen tip portion 31 is driven with the selected code while the edge of the drive waveform is finely adjusted in accordance with the drive timing of the touch panel controller 10. At this time, the drive circuit 38 of the stylus pen 3 is driven in accordance with the drive timing of the touch panel controller 10.

Meanwhile, the drive operation of the touch panel controller 10 is configured by repeating three periods of a period during which the drive lines $DL_1$ to $DL_L$ are driven with the same waveform, a pause period, and a period during which driving of the drive lines $DL_1$ to $DL_K$ to $DL_L$ and driving of the sense lines $SL_1$ to $SL_K$ to $SL_L$ are switched.

The period during which the drive lines $DL_1$ to $DL_L$ are driven with the same waveform is a period during which the additional information+the synchronization waveform for the synchronization of the stylus pen 3 are driven. Specifically, as illustrated in FIG. 14(b), the drive lines $DL_1$ to $DL_L$ are driven with the same waveform.

The pause period is a period during which the stylus pen 3 ends the detection of synchronization and prepares for driving. Specifically, as illustrated in FIG. 14(b), the pause period is a standby period for disposing a preparation period during which the stylus pen 3 detects the synchronization waveform and performs normal driving. Thus, the drive waveform during the pause period does not have any meaning and is completely arbitrary. Therefore, driving may not be performed in the pause period. This duration is not necessary when the preparation period on the stylus pen 3 side is not necessary.

Next, the period during which driving of the drive lines $DL_1$ to $DL_K$ to $DL_L$ and driving of the sense lines $SL_1$ to $SL_K$ to $SL_L$ are switched is a normal drive period for position detection that is performed to obtain data of one face of the touch panel 2. Specifically, in the normal drive period, as illustrated in FIG. 14(c), driving of the drive lines $DL_1$ to $DL_L$ with a waveform necessary for detecting the position of a touch of the stylus pen 3 and sensing are repeated. Methods for driving include sequential driving and parallel driving. In FIG. 14(c), sequential driving is represented so as to facilitate visual understanding of the order of drive patterns.

The stylus pen 3, when detecting the synchronization waveform, drives the pen tip portion 31 with the same waveform as the drive line $DL_{L+1}$ that corresponds to the outside of the touch panel 2. In FIG. 14(c), colored backgrounds indicate a sense period, that is, a period during which an electrostatic capacitance for detecting the position of a touch is detected.

As such, the touch panel system 1 of the present embodiment is provided with the touch panel 2 that has electrostatic capacitances formed at each intersection of the horizontal signal lines $HL_1$ to $HL_K$ as the plurality of first signal lines and the vertical signal lines $VL_1$ to $VL_L$ as the plurality of second signal lines, the stylus pen 3 as a touch pen, and the touch panel controller 10. The touch panel controller 10, when repeatedly performing switched driving such that the plurality of horizontal signal lines $HL_1$ to $HL_K$ is driven to output charge signals based on each electrostatic capacitance from each of the vertical signal lines $VL_1$ to $VL_L$ during the first signal line drive period and such that the plurality of vertical signal lines $VL_1$ to $VL_L$ are driven to output charge signals based on each electrostatic capacitance from each of the horizontal signal lines $HL_1$ to $HL_K$ during the second signal line drive period, detects the position of a touch on the basis of a change in electrostatic capacitance due to the stylus pen 3 when the pen tip portion 31 of the stylus pen 3 touches the touch panel 2 while the pen tip portion 31 is driven with the waveform of the drive line $DL_{L+1}$.

Accordingly, when the stylus pen 3 touches the touch panel 2, a detected position in the first signal line drive period and a detected position in the second signal line drive period are represented at the same position. Meanwhile, an erroneous signal due to noise that is caused by the touch of a hand, a finger, and the like of a human body, which receives electromagnetic noise, on the touch panel and that is generated at a position different from the position of the touch, when represented in the first signal line drive period by switching driving of the first signal lines and the second signal lines, is not represented at the same position in the second signal line drive period.

Therefore, it is possible to distinguish a signal of a touch of the stylus pen 3 and an erroneous signal due to noise and easily remove the erroneous signal due to noise.

When the stylus pen 3 as an electronic pen that signals can be input into and output from is used as a touch pen, it is necessary to synchronize the stylus pen 3 with the synchronization signal used in the touch panel controller 10.

In this case, in the present embodiment, since the driver 12 as a synchronization signal transmission unit of the touch panel controller 10 transmits the synchronization signal to the stylus pen 3 during synchronization signal transmission periods immediately before each of the first signal line drive period and the second signal line drive period, it is possible to create the synchronization signal by using a drive signal for driving the first signal lines and the second signal lines. Thus, a separate circuit for creating the synchronization signal is not disposed, and the number of components can be reduced.

When the synchronization signal is transmitted from the touch panel controller 10 to the stylus pen 3, low-frequency signals are superimposed as noise on the synchronization signal. Thus, the synchronization signal may not be captured when noise is not appropriately separated in the case of a single pulse. Meanwhile, in the case of a plurality of unchanging pulses that has the same pitch, it is unclear which part corresponds to the synchronization signal.

Therefore, in the present embodiment, the driver 12 of the touch panel controller 10 transmits a synchronization signal having a waveform that is configured of a pseudorandom sequence having periodicity such as the M-sequence code or the Gold sequence code to the stylus pen 3 during the synchronization signal transmission period, and the stylus pen 3 is provided with the sense circuit 35 and the synchronization signal detector circuit 36 as a synchronization signal detecting unit that detects the synchronization signal.

Thus, the synchronization signal, since being transmitted with a waveform that is configured of a pseudorandom sequence having periodicity, has good autocorrelation characteristics. Thus, accuracy increases in identifying the synchronization signal, and it is possible to reduce the synchronization signal not being captured.

Therefore, it is possible to provide the touch panel system 1 that can appropriately detect the synchronization signal.

When the synchronization signal on which low-frequency components are superimposed is received and when the reset operation is performed with pulses having a long High period or Low period in the case of detecting the amplitude of the synchronization signal by periodically performing the reset operation to return the received input waveform to the reference potential, potential changes unnecessarily, and it is difficult to determine the waveform.

Therefore, in the present embodiment, the synchronization signal having a waveform configured of a pseudorandom sequence is Manchester-coded. That is, in a Manchester-coding process, a process of associating "0" of the pseudorandom sequence with High→Low of the synchronization waveform and associating "1" with Low→High of the synchronization waveform is performed. The opposite may also be possible. Accordingly, it is possible to prevent the period of High or Low from being lengthened.

In the touch panel system 1 of the present embodiment, the driver 12 as a synchronization signal transmission unit of the touch panel controller 10 doubles as the driver 12 as a drive unit that supplies a drive signal for driving the horizontal signal lines $HL_1$ to $HL_K$ as the plurality of first signal lines or the vertical signal lines $VL_1$ to $VL_L$ as the plurality of second signal lines. The driver 12 transmits the synchronization signal by changing the drive signal for driving the plurality of horizontal signal lines $HL_1$ to $HL_K$ or the plurality of vertical signal lines $VL_1$ to $VL_L$ to a waveform that is configured of a Manchester-coded pseudorandom sequence having periodicity.

Accordingly, since the synchronization signal transmission unit is configured of the driver 12 that doubles as a drive unit, it is possible to create the synchronization signal by simply changing the waveform pattern of the drive signals of the drive lines $DL_1$ to $DL_L$ that are used to drive the horizontal signal lines $HL_1$ to $HL_K$ and the vertical signal lines $VL_1$ to $VL_L$. Thus, a separate circuit for creating the synchronization signal is not disposed, and the number of components can be certainly reduced.

Second Embodiment

Another embodiment of the present invention will be described as follows on the basis of FIG. 15(a) to FIG. 21. Configurations other than those described in the present embodiment are the same as those of the first embodiment. For convenience of description, members having the same function as the members illustrated in the drawings of the first embodiment will be designated by the same reference sign, and descriptions thereof will be omitted.

(Characteristic Operation of Synchronization of Touch Panel Controller and Stylus Pen)

Figure 15:
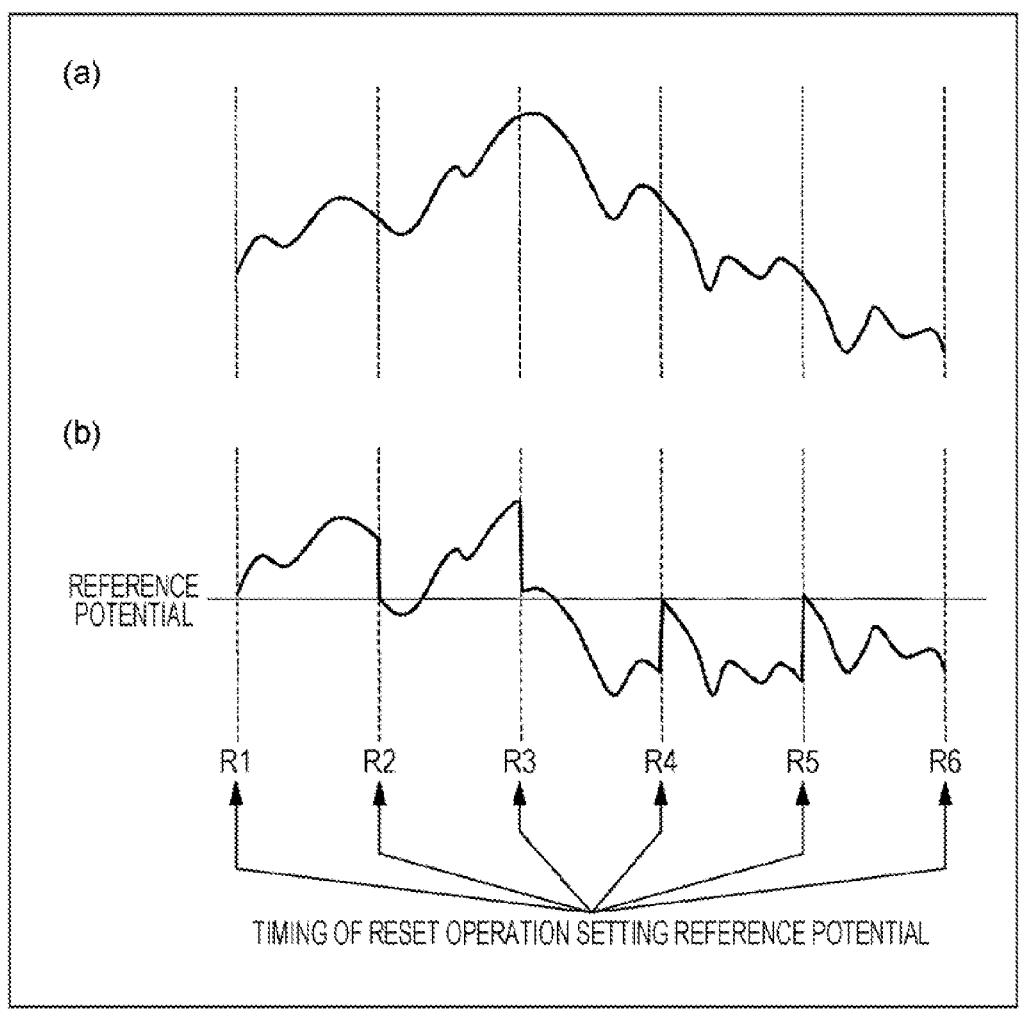
FIG. 15(a) is a waveform diagram illustrating an input waveform of a signal received by the stylus pen in a touch panel system in a second embodiment of the present invention.
FIG. 15(b) is a waveform diagram illustrating an internal waveform when a reference potential is set at reset timings R1 to R6.
Figure 18:
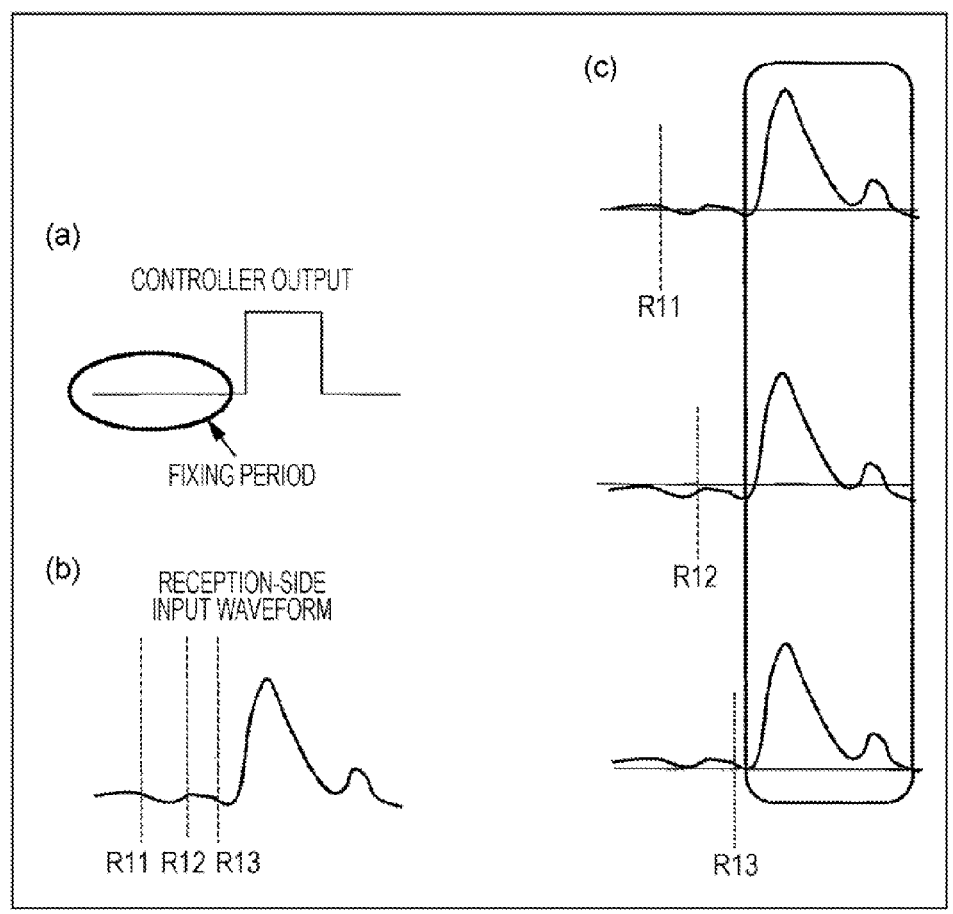
FIG. 18(a) is a waveform diagram illustrating an example of a synchronization waveform transmitted from the touch panel controller.
FIG. 18(b) is a waveform diagram illustrating reset timings R11, R12, and R13 of an input waveform received by the stylus pen.
FIG. 18(c) is a waveform diagram illustrating a synchronization waveform when a reference potential is set at the reset timings R11, R12, and R13 illustrated in FIG. 18(b).
Figure 19:
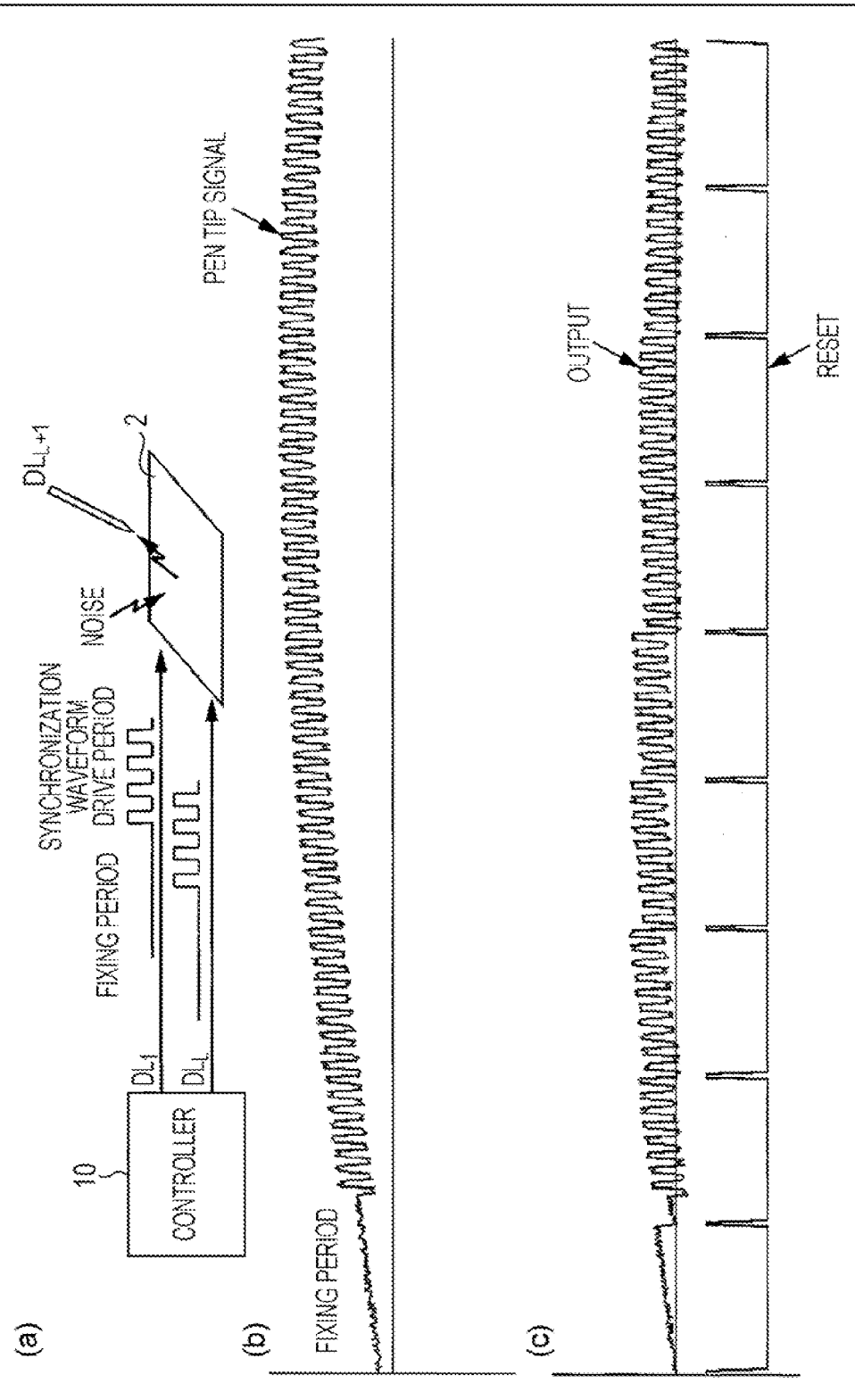
FIG. 19(a) is a diagram illustrating a method for transmitting a synchronization waveform that is transmitted by drive lines $DL_1$ to $DL_L$ of the driver in the touch panel controller.
FIG. 19(b) is a waveform diagram illustrating an input waveform received by the stylus pen.
FIG. 19(c) is a waveform diagram illustrating a synchronization waveform when a reference potential is set after the input waveform is initially reset in the fixing period illustrated in FIG. 19(b).

In the present embodiment, synchronization of the stylus pen 3 and, furthermore, a method that may prevent the pulses of the dedicated synchronization signal from not being captured will be described on the basis of FIG. 15(a) to FIG. 19(c). FIG. 15(a) is a waveform diagram illustrating the input waveform of a signal received by the stylus pen in the touch panel system of the present embodiment, and FIG. 15(b) is a waveform diagram illustrating an internal waveform when a reference potential is set at reset timings R1 to R6. FIG. 16(a) is a waveform diagram illustrating an example of a synchronization waveform transmitted from the touch panel controller, FIG. 16(b) is a waveform diagram illustrating reset timings R7, R8, and R9 of an input waveform received by the stylus pen, and FIG. 16(c) is a waveform diagram illustrating a synchronization waveform when a reference potential is set at the reset timings R7, R8, and R9 illustrated in FIG. 16(b). FIG. 17 is a timing chart illustrating output waveforms of the touch panel controller in which a fixing period is disposed immediately before a synchronization waveform is output. FIG. 18(a) is a waveform diagram illustrating an example of a synchronization waveform transmitted from the touch panel controller, FIG. 18(b) is a waveform diagram illustrating reset timings R11, R12, and R13 of an input waveform received by the stylus pen, and FIG. 18(c) is a waveform illustrating a synchronization waveform when a reference potential is set at the reset timings R11, R12, and R13 illustrated in FIG. 18(b). FIG. 19(a) is a diagram illustrating a method for transmitting a synchronization waveform that is transmitted by drive lines $DL_1$ to $DL_L$ of the driver in the touch panel controller, FIG. 19(b) is a waveform diagram illustrating an input waveform received by the stylus pen, and FIG. 19(c) is a waveform diagram illustrating a synchronization waveform when a reference potential is set after the input waveform is initially reset in the fixing period illustrated in FIG. 19(b).

When the reset operation is performed at the reset timings R1 to R6 where a reference potential is set in a case where the input waveform illustrated in FIG. 15(a) is obtained in the stylus pen 3, the internal waveform illustrated in FIG. 15(b) is obtained.

In this case, even when the Manchester-coded M-sequence code is used, as illustrated in FIGS. 16(a) to 16(c), the same signal has different potentials depending on the timing of the reset operation that sets a reference potential, and the difficulty of identifying whether the synchronization waveform output of the touch panel controller 10 is High or Low remains the same. That is, it is difficult to find whether a second peak is High or Low.

Therefore, in the present embodiment, as illustrated in FIG. 17, a fixing period F is disposed immediately before the output of the synchronization waveform to fix the output waveform of the touch panel controller 10. The time of fixing is set to a time in which the timing of the reset operation that sets a reference potential in the reception-side stylus pen 3 is included at least once.

Accordingly, a stable potential can be set as a reference potential before the synchronization waveform is output.

Specifically, as illustrated in FIGS. 18(a) and 18(b), the reset timings R11, R12, and R13 are disposed in the fixing period F to set a reference potential. Accordingly, as illustrated in FIG. 18(c), the identification of whether the output of the touch panel controller 10 is High or Low is facilitated when the synchronization waveform is detected.

As a consequence, as illustrated in FIG. 17, the potential when the reset operation ends becomes a reference potential by disposing the fixing period F before the synchronization waveform is output. Thus, as illustrated in FIGS. 19(a) to 19(c), by disposing the fixing period F that is longer than the interval between the reset operations in the stylus pen 3, the reset operation is certainly performed once or more prior to the synchronization signal detection period in a state where the drive potential of the touch panel controller 10 is set, and the waveform can be shaped in a stable state from the start of the synchronization signal detection period.

(Overall Operation of Touch Panel System and Stylus Pen)

Figure 20:
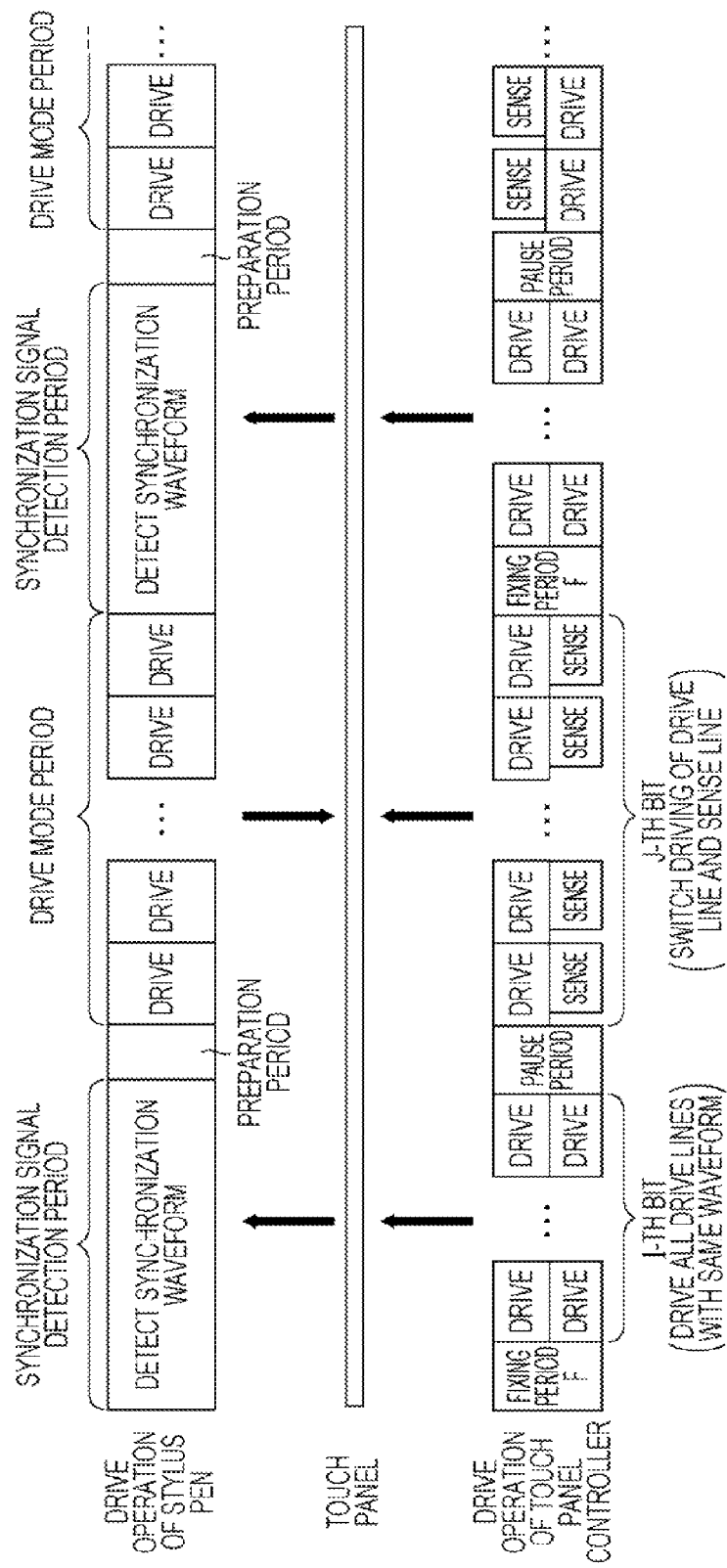
FIG. 20 is an operation image diagram illustrating a correspondence between a drive operation of the touch panel controller and a drive operation of the stylus pen.
Figure 21:
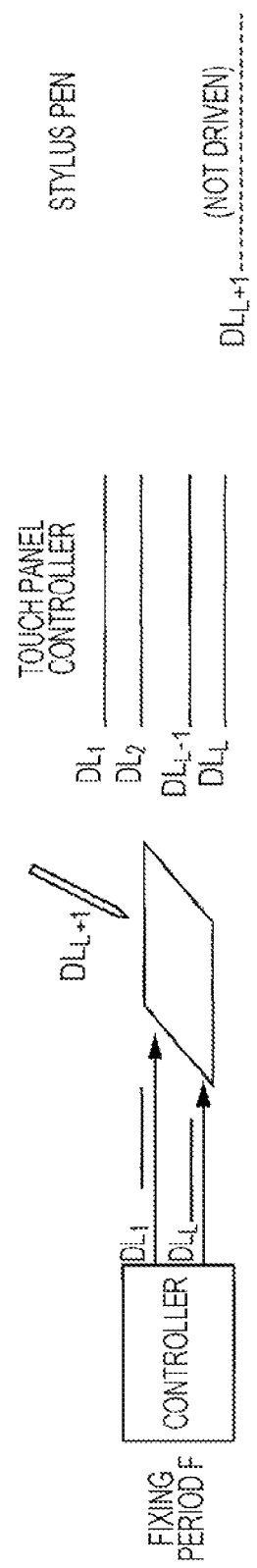
FIG. 21 is a diagram illustrating a specific drive operation in the fixing period illustrated in FIG. 20.

Overall operation of the touch panel system 1 and the stylus pen 3 having the above configurations will be described on the basis of FIG. 20 and FIG. 21. FIG. 20 is an operation image diagram illustrating a correspondence between a drive operation of the touch panel controller 10 and a drive operation of the stylus pen 3. FIG. 21 is a diagram illustrating a specific drive operation in the fixing period illustrated in FIG. 20. In the description of FIG. 20 and FIG. 21, the same part as FIG. 13 and FIGS. 14(a) to 14(c) of the first embodiment will be briefly described.

The stylus pen 3, as illustrated in FIG. 20, includes the synchronization signal detection period for detecting the synchronization signal from the touch panel controller 10 with the sense circuit 35 and the synchronization signal detector circuit 36, the preparation period, and the drive mode period during which the pen tip portion 31 is driven by the drive circuit 38.

The synchronization signal detection period, the preparation period, and the drive mode period are the same as those described in FIG. 13 and FIGS. 14(a) to 14(c).

Meanwhile, the touch panel controller 10 includes the fixing period F, the period during which the drive lines $DL_1$ to $DL_L$ are driven with the same waveform, the pause period, and a period during which the drive lines $DL_1$ to $DL_L$ are driven and during which a change in electrostatic capacitance is read by the sense lines $SL_1$ to $SL_L$.

The fixing period F is a period for stabilizing a signal level with which the stylus pen 3 detects synchronization. Specifically, in the fixing period F, as illustrated in FIG. 21, the drive lines $DL_1$ to $DL_L$ are fixed to either Low or High. Although any of Low and High is favorable, the drive lines $DL_1$ to $DL_L$ are fixed to Low in the present embodiment. Thus, the drive lines $DL_1$ to $DL_L$ of the touch panel controller 10 have zero potentials. At this time, the drive line $DL_{L+1}$ for the pen pressure sensor 31d of the stylus pen 3 is not driven.

The period during which the drive lines $DL_1$ to $DL_L$ are driven with the same waveform is a period during which the additional information+the synchronization waveform for the synchronization of the stylus pen 3 are driven. Specifically, as illustrated in FIG. 14(b), the drive lines $DL_1$ to $DL_L$ are driven with the same waveform.

The pause period is a period during which the stylus pen 3 ends the detection of synchronization and prepares for driving. Specifically, as illustrated in FIG. 14(b), the pause period is a standby period for disposing a preparation period during which the stylus pen 3 detects the synchronization waveform and performs normal driving. Thus, the drive waveform during the pause period does not have any meaning and is completely arbitrary. Therefore, driving may not be performed in the pause period. In addition, the drive line $DL_{L+1}$ for the pen pressure sensor 31d of the stylus pen 3 is also not driven. This duration is not necessary when the preparation period on the stylus pen 3 side is not necessary.

Next, the period during which the drive lines $DL_1$ to $DL_L$ are driven and during which a change in electrostatic capacitance is read by the sense lines $SL_1$ to $SL_L$ is a normal drive period for position detection that is performed to obtain data of one face of the touch panel 2. Specifically, in the normal drive period, as illustrated in FIG. 14(c), driving of the drive lines $DL_1$ to $DL_L$ and reading from the sense lines $SL_1$ to $SL_L$ are repeated. Methods for driving include sequential driving and parallel driving. In FIG. 14(c), sequential driving is represented so as to facilitate visual understanding of the order of drive patterns.

The stylus pen 3, when detecting the synchronization waveform, drives the drive line $DL_{L+1}$ that corresponds to the outside of the touch panel 2. That is, the stylus pen 3 outputs a waveform that corresponds to the drive line $DL_{L+1}$ in accordance with driving of the drive lines $DL_1$ to $DL_L$ by the touch panel controller 10. In FIG. 14(c), colored backgrounds indicate a sense period, that is, a period during which an electrostatic capacitance is detected.

As such, in the touch panel system 1 of the present embodiment, the sense circuit 35 and the synchronization signal detector circuit 36 as a synchronization signal detecting unit of the stylus pen 3 as an electronic pen detect the amplitude of the synchronization signal by periodically performing the reset operation to return the received input waveform to the reference potential when the synchronization signal on which low-frequency components are superimposed is received. Accordingly, it is possible to detect the amplitude of the synchronization signal inexpensively without using an expensive low frequency cut-off filter for the removal of low-frequency components superimposed as noise.

When the reset operation overlaps with a High part of a pulse while the reset operation is arbitrarily performed on the received input waveform, the subsequent signal waveform becomes negative, and thus the positive High part of the pulse cannot be recognized correctly. As a consequence, the synchronization signal may not be captured.

Therefore, in the present embodiment, the synchronization signal transmission period is configured of the fixing period F during which a fixed synchronization signal of which the waveform is fixed to High or Low is transmitted and a pseudorandom sequence waveform period during which the synchronization signal of which the waveform is configured of a pseudorandom sequence having periodicity such as the M-sequence code or the Gold sequence code is transmitted. In the fixing period F, the reset operation is performed at least once.

Accordingly, since the input waveform returns to the reference potential in the fixing period F during which the waveform is fixed to High or Low, it is possible to appropriately determine whether the subsequent pulse is High or Low.

Third Embodiment

Still another embodiment of the present invention will be described as follows on the basis of FIG. 22. Configurations other than those described in the present embodiment are the same as those of the first embodiment. For convenience of description, members having the same function as the members illustrated in the drawings of the first embodiment will be designated by the same reference sign, and descriptions thereof will be omitted.

The touch panel system 1 of the first embodiment is described in an example where one stylus pen 3 is disposed. However, the touch panel system 1 of the present embodiment is different in that two stylus pens 3A and 3B can be used as the stylus pen 3.

Figure 22:
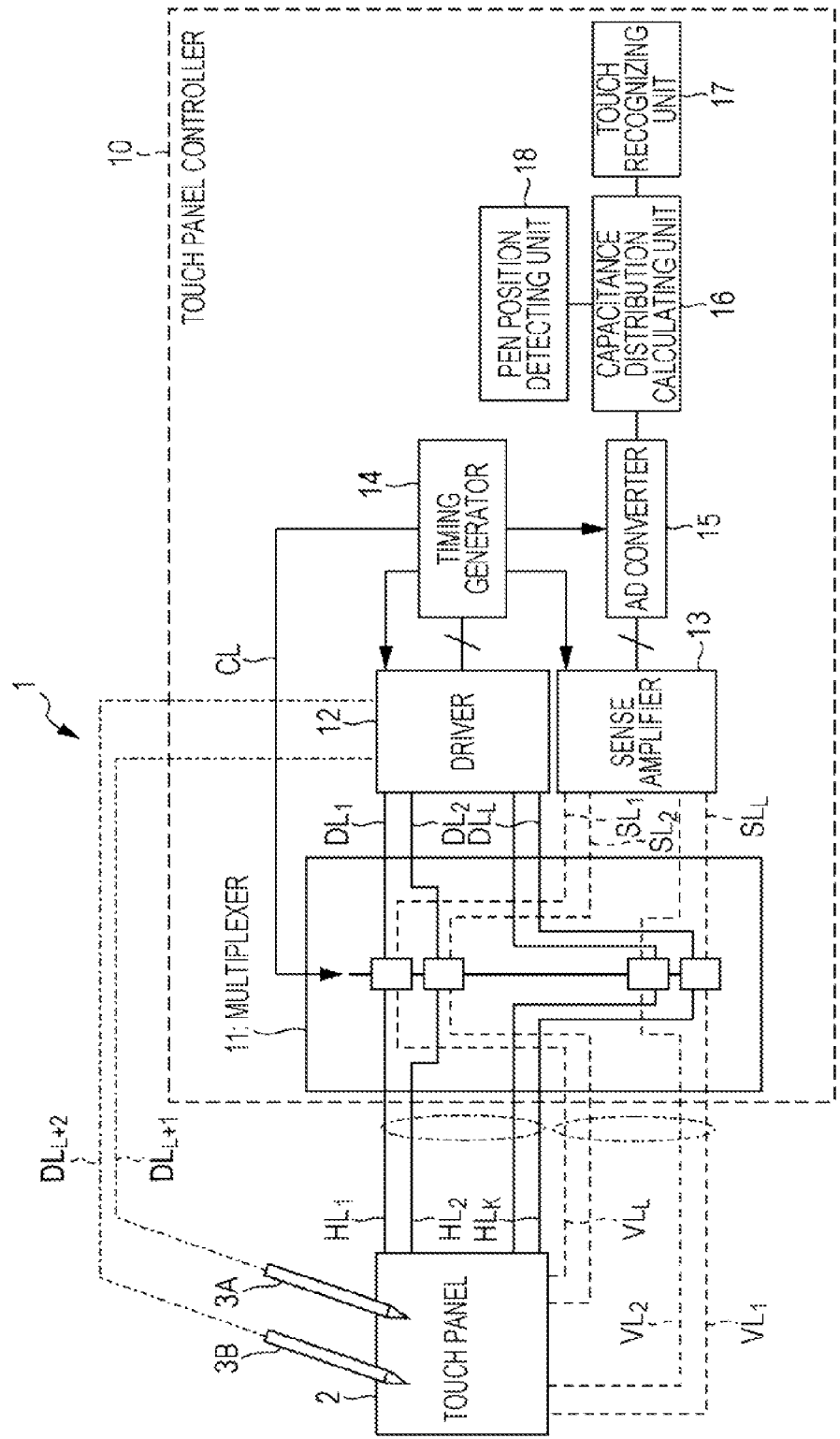
FIG. 22 is a block diagram illustrating a configuration of a touch panel system in a third embodiment of the present invention.

In the touch panel system 1 of the present embodiment, the two stylus pens 3A and 3B are disposed as the stylus pen 3 as illustrated in FIG. 22.

While the stylus pen 3A drives the pen tip portion 31 with a waveform corresponding to the drive line $DL_{L+1}$, the stylus pen 3B drives the pen tip portion 31 with a waveform corresponding to a drive line $DL_{L+2}$.

As such, when the two stylus pens 3A and 3B exist, it is possible to obtain the coordinates of a touch of each of the stylus pens 3A and 3B by using the drive line $DL_{L+1}$ and the drive line $DL_{L+2}$.

Therefore, even if there are provided more than one stylus pen 3, it is possible to easily obtain the coordinates of touches of the plurality of stylus pens 3A and 3B by increasing the number of drive lines DL in correspondence with the number of stylus pens 3.

Fourth Embodiment

Still another embodiment of the present invention will be described as follows on the basis of FIG. 23. Configurations other than those described in the present embodiment are the same as those of the first embodiment and the second embodiment. For convenience of description, members having the same function as the members illustrated in the drawings of the first embodiment and the second embodiment will be designated by the same reference sign, and descriptions thereof will be omitted.

In the present embodiment, a case where the touch panel system 1 is mounted on a mobile phone as an electronic device will be described on the basis of FIG. 23. FIG. 23 is a block diagram illustrating a configuration of the mobile phone.

Figure 23:
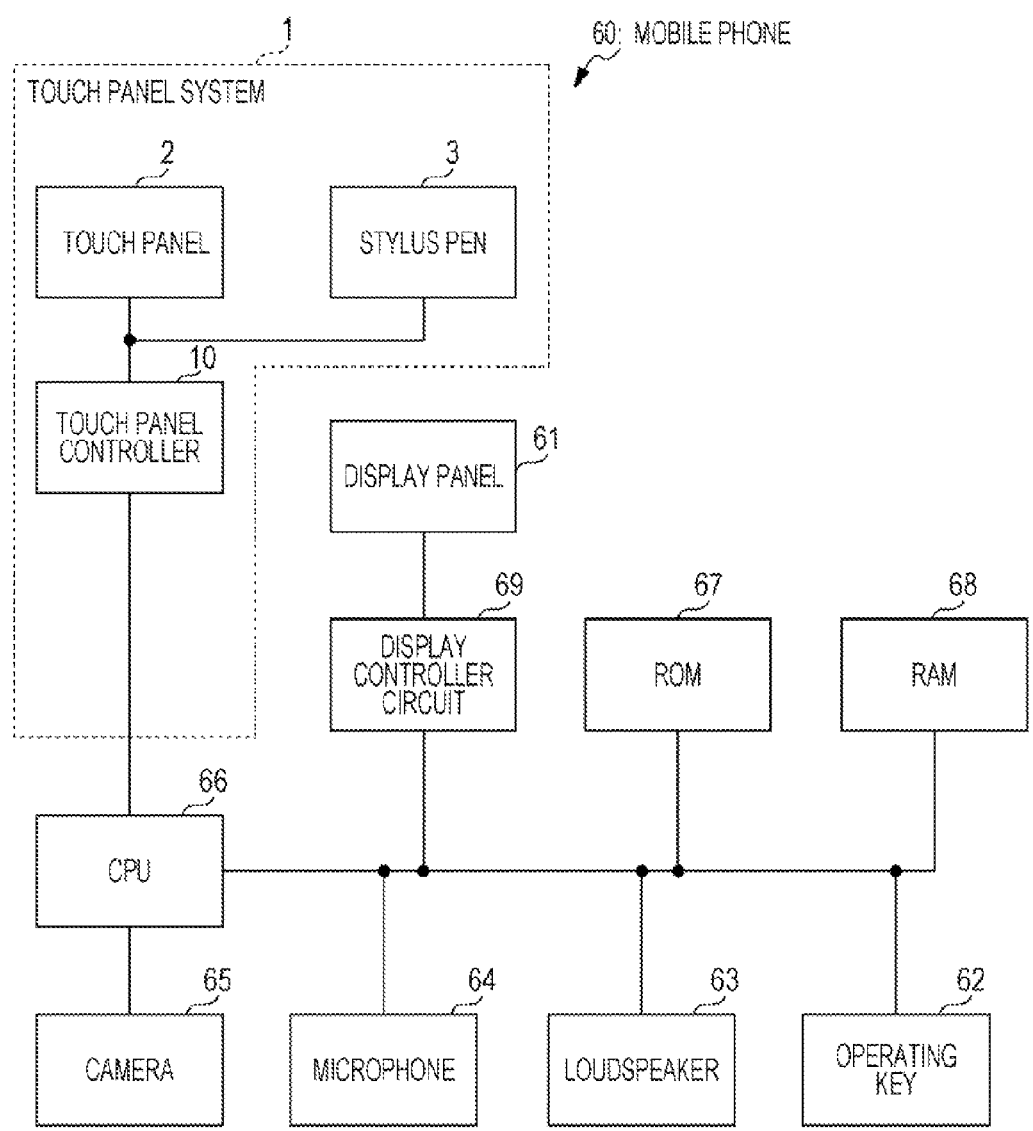
FIG. 23 is a block diagram illustrating a configuration of a mobile phone that is provided with a touch panel system in a fourth embodiment of the present invention.

A mobile phone 60 of the present embodiment, as illustrated in FIG. 23, is provided with the touch panel system 1, a display panel 61, an operating key 62, a loudspeaker 63, a microphone 64, a camera 65, a CPU 66, a ROM 67, a RAM 68, and a display controller circuit 69. The constituent elements are connected to each other by a data bus.

The touch panel system 1, as described above, includes the touch panel 2, the touch panel controller 10 that detects an electrostatic capacitance or an electrostatic capacitance difference, and the stylus pen 3.

The display panel 61 uses the display controller circuit 69 to display an image stored on the ROM 67 and the RAM 68. In addition, the display panel 61 either overlies the touch panel 2 or incorporates the touch panel 2. It is also possible to cause a touch recognition signal that indicates the position of a touch on the touch panel 2 and that is generated by the touch recognizing unit 17 to play the same role as a signal that indicates that the operating key 62 is operated.

The operating key 62 receives an instruction that is input by a user of the mobile phone 60.

The loudspeaker 63 outputs sound that is based on, for example, music data stored on the RAM 68.

The microphone 64 receives input of the voice of the user. The mobile phone 60 digitizes the input voice (analog data). Then, the mobile phone 60 transmits the digitized voice to a communication opponent (for example, other mobile phones).

The camera 65 captures an image of a subject in response to the user operating the operating key 62. The captured image data of the subject is stored on the RAM 68 or an external memory (for example, a memory card).

The CPU 66 controls the operation of the touch panel system 1 and the mobile phone 60. The CPU 66, for example, executes programs stored on the ROM 67.

The ROM 67 stores data in a non-volatile manner. In addition, the ROM 67 is a ROM such as an erasable programmable read-only memory (EPROM) or a flash memory on which data can be written and deleted. Although illustration is not provided in FIG. 21, the mobile phone 60 may be configured to be provided with an interface (IF) for wired connection to other electronic devices.

The RAM 68 stores data that is generated by the CPU 66 executing a program or data that is input through the operating key 62 in a volatile manner.

As such, the mobile phone 60 as an electronic device in the present embodiment is provided with the touch panel system 1. Accordingly, it is possible to provide the mobile phone 60 as an electronic device that is provided with the touch panel system 1 which can appropriately detect the synchronization signal.

CONCLUSION

The touch panel system 1 in a first aspect of the present invention, in order to resolve the above problem, includes the touch panel 2 that has electrostatic capacitances formed at each intersection of the plurality of first signal lines (horizontal signal lines $HL_1$ to $HL_K$) and the plurality of second signal lines (vertical signal lines $VL_1$ to $VL_L$), a touch pen (stylus pen 3), and the touch panel controller 10. In the touch panel system 1, the touch panel controller 10, when repeatedly performing switched driving such that the plurality of first signal lines (horizontal signal lines $HL_1$ to $HL_K$) is driven to output charge signals based on each electrostatic capacitance from each of the second signal lines (vertical signal lines $VL_1$ to $VL_L$) during the first signal line drive period and such that the plurality of second signal lines (vertical signal lines $VL_1$ to $VL_L$) is driven to output charge signals based on each electrostatic capacitance from each of the first signal lines (horizontal signal lines $HL_1$ to $HL_K$) during the second signal line drive period, detects the position of a touch on the basis of a change in electrostatic capacitance due to the touch pen (stylus pen 3) when the touch pen (stylus pen 3) touches the touch panel 2. The touch pen (stylus pen 3) is configured of an electronic pen (stylus pen 3) that signals can be input into and output from. The touch panel controller 10 includes a synchronization signal transmission unit (driver 12) that transmits the synchronization signal to the electronic pen (stylus pen 3) during the synchronization signal transmission periods immediately before each of the first signal line drive period and the second signal line drive period. The synchronization signal transmission unit (driver 12) transmits the synchronization signal of which the waveform is configured of a Manchester-coded pseudorandom sequence having periodicity to the electronic pen (stylus pen 3) during the synchronization signal transmission period. The electronic pen (stylus pen 3) includes a synchronization signal detecting unit (the sense circuit 35 and the synchronization signal detector circuit 36) that detects the synchronization signal. The pseudorandom sequence having periodicity refers to a code sequence such as the M-sequence or the Gold sequence that is used in a pseudorandom signal which is an artificially created random signal. In addition, the driving may be either parallel driving or sequential driving.

According to the invention, a touch panel system includes a touch panel that has electrostatic capacitances formed at each intersection of a plurality of first signal lines and a plurality of second signal lines, a touch pen, and a touch panel controller, in which the touch panel controller, when repeatedly performing switched driving such that the plurality of first signal lines is driven to output charge signals based on each electrostatic capacitance from each of the second signal lines during a first signal line drive period and such that the plurality of second signal lines is driven to output charge signals based on each electrostatic capacitance from each of the first signal lines during a second signal line drive period, detects the position of a touch on the basis of a change in electrostatic capacitance due to the touch pen when the touch pen touches the touch panel.

Accordingly, when the touch pen touches the touch panel, a detected position in the first signal line drive period and a detected position in the second signal line drive period are represented at the same position. Meanwhile, an erroneous signal due to noise that is caused by the touch of a hand, a finger, and the like of a human body, which receives electromagnetic noise, on the touch panel and that is generated at a position different from the position of the touch, even when represented in the first signal line drive period by switching driving of the first signal lines and the second signal lines, is not represented at the same position in the second signal line drive period.

Therefore, it is possible to distinguish a signal of a touch of the touch pen and an erroneous signal due to noise and easily remove the erroneous signal due to noise.

When the electronic pen that signals can be input into and output from is used as a touch pen, it is necessary to synchronize the electronic pen with the synchronization signal used in the touch panel controller.

In this case, in the present invention, since the synchronization signal transmission unit of the touch panel controller transmits the synchronization signal to the electronic pen during the synchronization signal transmission periods immediately before each of the first signal line drive period and the second signal line drive period, it is possible to create the synchronization signal by using a drive signal for driving the first signal lines and the second signal lines. Thus, a separate circuit for creating the synchronization signal is not disposed, and the number of components can be reduced.

When the synchronization signal is wirelessly transmitted from the touch panel controller to the electronic pen, low-frequency signals are superimposed as noise on the synchronization signal. Thus, the synchronization signal may not be captured when noise is not appropriately separated in the case of a single pulse. Meanwhile, in the case of a plurality of unchanging pulses that has the same pitch, it is unclear which part corresponds to the synchronization signal.

Therefore, in the present invention, the synchronization signal transmission unit of the touch panel controller transmits a synchronization signal having a waveform that is configured of a Manchester-coded pseudorandom sequence having periodicity to the electronic pen during the synchronization signal transmission period, and the electronic pen is provided with the synchronization signal detecting unit that detects the synchronization signal.

Thus, the synchronization signal, since being transmitted with a waveform that is configured of a pseudorandom sequence having periodicity, has good autocorrelation characteristics. Thus, accuracy increases in identifying the synchronization signal, and it is possible to reduce the synchronization signal not being captured.

In the present invention, the synchronization signal having a waveform configured of a pseudorandom sequence is Manchester-coded.

When the synchronization signal on which low-frequency components are superimposed is received and when the reset operation is performed with pulses having a long High period or Low period in the case of detecting the amplitude of the synchronization signal by periodically performing the reset operation to return the received input waveform to the reference potential, potential changes unnecessarily, and it is difficult to determine the waveform.

Therefore, in the present invention, the synchronization signal having a waveform configured of a pseudorandom sequence is Manchester-coded. That is, in the Manchester-coding process, a process of associating "0" of the pseudorandom sequence with High→Low of the synchronization waveform and associating "1" with Low→High of the synchronization waveform is performed. The opposite may also be possible. Accordingly, it is possible to prevent the period of High or Low from being lengthened.

Therefore, it is possible to provide the touch panel system that can appropriately detect the synchronization signal.

It is preferable that in the touch panel system 1 in a second aspect of the present invention, the synchronization signal detecting unit (the sense circuit 35 and the synchronization signal detector circuit 36) of the electronic pen (stylus pen 3) in the touch panel system 1 of the first aspect, when receiving the synchronization signal on which low-frequency components are superimposed, detects the amplitude of the synchronization signal by periodically performing the reset operation to return the received input waveform to the reference potential, the synchronization signal transmission period is configured of the fixing period F during which a fixed synchronization signal of which the waveform is fixed to High or Low is transmitted and the pseudorandom sequence waveform period during which the synchronization signal of which the waveform is configured of the pseudorandom sequence having periodicity is transmitted, and the reset operation is performed at least once in the fixing period F.

In the present invention, the synchronization signal detecting unit of the electronic pen, when receiving the synchronization signal on which low-frequency components are superimposed, detects the amplitude of the synchronization signal by periodically performing the reset operation to return the received input waveform to the reference potential. Accordingly, it is possible to detect the amplitude of the synchronization signal inexpensively without using an expensive low frequency cut-off filter for the removal of low-frequency components superimposed as noise.

When the reset operation overlaps with a High part of a pulse while the reset operation is arbitrarily performed on the received input waveform, the subsequent signal waveform becomes negative, and thus the positive High part of the pulse cannot be recognized correctly. As a consequence, the synchronization signal may not be captured.

Therefore, in the present invention, the synchronization signal transmission period is configured of the fixing period during which a fixed synchronization signal of which the waveform is fixed to High or Low is transmitted and the pseudorandom sequence waveform period during which the synchronization signal of which the waveform is configured of the pseudorandom sequence having periodicity is transmitted. In the fixing period, the reset operation is performed at least once.

Accordingly, since the input waveform returns to the reference potential in the fixing period during which the waveform is fixed to High or Low, it is possible to appropriately determine whether the subsequent pulse is High or Low.

It is preferable that in the touch panel system 1 in a third aspect of the present invention, the synchronization signal transmission unit of the touch panel controller 10 in the touch panel system 1 of the first or second aspect doubles as a drive unit (driver 12) that supplies drive signals for driving the plurality of first signal lines (horizontal signal lines $HL_1$ to $HL_K$) or the plurality of second signal lines (vertical signal lines $VL_1$ to $VL_L$), and the drive unit (driver 12) transmits the synchronization signal by changing the drive signals for driving the plurality of first signal lines (horizontal signal lines $HL_1$ to $HL_K$) or the plurality of second signal lines (vertical signal lines $VL_1$ to $VL_L$) to the waveform that is configured of the Manchester-coded pseudorandom sequence having periodicity.

Accordingly, since the synchronization signal transmission unit doubles as the drive unit, it is possible to create the synchronization signal by simply changing the pattern of the drive signals for driving the first signal lines and the second signal lines. Thus, a separate circuit for creating the synchronization signal is not disposed, and the number of components can be certainly reduced.

In the touch panel system 1 in a fourth aspect of the present invention, the electronic pen (stylus pen 3) in the touch panel system 1 of the third aspect may include the pen pressure sensor 31d.

Accordingly, it is possible to detect pen pressure information when the electronic pen touches the touch panel.

An electronic device (mobile phone 60) in a fifth aspect of the present invention is provided with the touch panel system 1 that is written in any one of the first to fourth aspects.

According to the invention, it is possible to provide an electronic device that is provided with a touch panel system which can appropriately detect a synchronization signal.

The present invention is not limited to each embodiment described above. Various modifications can be carried out within the scope of the claims. In addition, an embodiment that is obtained by appropriately combining technical means disclosed in each different embodiment is also included in the technical scope of the present invention.

INDUSTRIAL APPLICABILITY

The present invention can be used in a touch panel system and an electronic device that detect the position of a touch of a touch pen on a touch panel which has electrostatic capacitances formed at each intersection of a plurality of first signal lines and a plurality of second signal lines and as an electronic device, for example, can be used in a mobile phone.

REFERENCE SIGNS LIST

1 TOUCH PANEL SYSTEM
2 TOUCH PANEL
3 STYLUS PEN (TOUCH PEN, ELECTRONIC PEN)
3A, 3B STYLUS PEN (TOUCH PEN, ELECTRONIC PEN)
10 TOUCH PANEL CONTROLLER
11 MULTIPLEXER
12 DRIVER (SYNCHRONIZATION SIGNAL TRANSMISSION UNIT, DRIVE UNIT)
13 SENSE AMPLIFIER
14 TIMING GENERATOR
15 AD CONVERTER
16 CAPACITANCE DISTRIBUTION CALCULATING UNIT
17 TOUCH RECOGNIZING UNIT
18 PEN POSITION DETECTING UNIT
30 PEN MAIN BODY
30a HOLDING PORTION
31 PEN TIP PORTION
31a PEN TIP COVER
31b PEN TIP AXIS
31c INSULATOR
31d PEN PRESSURE SENSOR
32 CONNECTION SWITCH
33 CONTROLLER CIRCUIT
34a, 34b OPERATION CHANGING SWITCH
35 SENSE CIRCUIT (SYNCHRONIZATION SIGNAL DETECTING UNIT)
36 SYNCHRONIZATION SIGNAL DETECTOR CIRCUIT (SYNCHRONIZATION SIGNAL DETECTING UNIT)
36a RESET CIRCUIT
37 TIMING ADJUSTER CIRCUIT
38 DRIVE CIRCUIT
39a FIRST OPERATING SWITCH
39b SECOND OPERATING SWITCH
60 MOBILE PHONE (ELECTRONIC DEVICE)
61 DISPLAY PANEL
62 OPERATING KEY
63 LOUDSPEAKER
64 MICROPHONE
65 CAMERA
66 CPU
67 ROM
68 RAM
69 DISPLAY CONTROLLER CIRCUIT
C11 to CKL ELECTROSTATIC CAPACITANCE
$DL_1$ to $DL_K$ to $DL_L$ DRIVE LINE (DRIVE SIGNAL LINE)
F FIXING PERIOD
$HL_1$ to $HL_K$ HORIZONTAL SIGNAL LINE
R RESET TIMING
$SL_1$ to $SL_K$ to $SL_L$ SENSE LINE
$VL_1$ to $VL_K$ to $VL_L$ VERTICAL SIGNAL LINE

The invention claimed is:

1. A touch panel system comprising:
a touch panel that has electrostatic capacitances formed at each intersection of a plurality of first signal lines and a plurality of second signal lines;
a touch pen; and
a touch panel controller, wherein the touch panel controller, when repeatedly performing switched driving such that the plurality of first signal lines is driven to output charge signals based on each electrostatic capacitance from each of the second signal lines during a first signal line drive period and such that the plurality of second signal lines is driven to output charge signals based on each electrostatic capacitance from each of the first signal lines during a second signal line drive period, detects the position of a touch on the basis of a change in electrostatic capacitance due to the touch pen when the touch pen touches the touch panel, the touch pen is configured of an electronic pen that signals can be input into and output from, the touch panel controller includes a synchronization signal transmission unit that transmits a synchronization signal to the electronic pen during synchronization signal transmission periods immediately before each of the first signal line drive period and the second signal line drive period, the synchronization signal transmission unit transmits the synchronization signal of which the waveform is configured of a Manchester-coded pseudorandom sequence having periodicity to the electronic pen during the synchronization signal transmission period, and the electronic pen includes a synchronization signal detecting unit that detects the synchronization signal.

2. The touch panel system according to claim 1, wherein the synchronization signal detecting unit of the electronic pen, when receiving the synchronization signal on which low-frequency components are superimposed, detects the amplitude of the synchronization signal by periodically performing a reset operation to return a received input waveform to a reference potential, the synchronization signal transmission period is configured of a fixing period during which a fixed synchronization signal of which the waveform is fixed to High or Low is transmitted and a pseudorandom sequence waveform period during which the synchronization signal of which the waveform is configured of the pseudorandom sequence having periodicity is transmitted, and the reset operation is performed at least once in the fixing period.

3. The touch panel system according to claim 2, wherein the synchronization signal transmission unit of the touch panel controller doubles as a drive unit that supplies drive signals which are used to drive the plurality of first signal lines or the plurality of second signal lines, and the drive unit transmits the synchronization signal by changing the drive signals that are used to drive the plurality of first signal lines or the plurality of second signal lines to the waveform that is configured of the Manchester-coded pseudorandom sequence having periodicity.

4. The touch panel system according to claim 3, wherein the electronic pen includes a pen pressure sensor.

5. The touch panel system according to claim 1, wherein the synchronization signal transmission unit of the touch panel controller doubles as a drive unit that supplies drive signals which are used to drive the plurality of first signal lines or the plurality of second signal lines, and the drive unit transmits the synchronization signal by changing the drive signals that are used to drive the plurality of first signal lines or the plurality of second signal lines to the waveform that is configured of the Manchester-coded pseudorandom sequence having periodicity.

6. The touch panel system according to claim 5, wherein the electronic pen includes a pen pressure sensor.

7. An electronic device comprising:

the touch panel system according to claim 1.

* * * * *